(12) United States Patent
Beall

(10) Patent No.: US 7,601,256 B2
(45) Date of Patent: Oct. 13, 2009

(54) REVERSE OSMOSIS FILTRATION SYSTEMS

(75) Inventor: Timothy A. Beall, Redondo Beach, CA (US)

(73) Assignee: Next-RO, Inc., Kernville, CA (US)

( * ) Notice: Subject to any disclaimer, the term of this patent is extended or adjusted under 35 U.S.C. 154(b) by 393 days.

(21) Appl. No.: 11/509,906

(22) Filed: Aug. 25, 2006

(65) Prior Publication Data

US 2007/0045165 A1    Mar. 1, 2007

Related U.S. Application Data

(60) Provisional application No. 60/711,837, filed on Aug. 26, 2005.

(51) Int. Cl.
*B01D 63/00* (2006.01)
*B01D 61/00* (2006.01)

(52) U.S. Cl. .................. 210/116; 210/96.2; 210/97; 210/257.2; 210/321.76; 210/321.64

(58) Field of Classification Search ............ None
See application file for complete search history.

(56) References Cited

U.S. PATENT DOCUMENTS

| | | |
|---|---|---|
| 2,299,611 A | 10/1942 | Clark |
| 2,343,320 A | 3/1944 | Parker |
| 2,349,321 A | 5/1944 | White |
| 2,349,322 A | 5/1944 | White |
| 2,360,590 A | 10/1944 | Schweller |
| 2,380,866 A | 7/1945 | Overbeke |
| 2,387,598 A | 10/1945 | Mercier |
| 2,389,791 A | 11/1945 | Lippincott |
| 2,389,792 A | 11/1945 | Lippincott |
| 2,390,319 A | 12/1945 | Overbeke |
| 2,394,401 A | 2/1946 | Overbeke |
| 2,397,248 A | 3/1946 | De Kiss |
| 2,991,885 A * | 7/1961 | Gutkowski .................. 210/133 |
| 3,232,318 A | 2/1966 | Mercier |
| 3,365,061 A | 1/1968 | Bray |

(Continued)

FOREIGN PATENT DOCUMENTS

DE     36 42 882 A1    6/1988

(Continued)

OTHER PUBLICATIONS

"Supplementary European Search Report Dated Aug. 18, 2008", European Patent Application No. 06813876.7.

*Primary Examiner*—Krishnan S Menon
(74) *Attorney, Agent, or Firm*—Blakely Sokoloff Taylor & Zafman LLP

(57) ABSTRACT

Reverse osmosis filtration systems that are self contained and easily converted from above the counter use to below the counter use. The systems feature a simple construction, including a two piece manifold assembly to which filters, including a reverse osmosis filter, a product water storage tank and a control valve connect, all without separate fasteners. The manifold assembly provides all water connections within the system, and includes connections to connect to a water supply, a drain, two dispensers and to an auxiliary water storage tank. The system pressurizes squeeze water for product water dispensing, providing maximum efficiency, maximum storage capacity for a given tank size and maximum pressure for dispensing product water. Various embodiments are disclosed.

10 Claims, 27 Drawing Sheets

U.S. PATENT DOCUMENTS

| | | | |
|---|---|---|---|
| 3,406,722 A | 10/1968 | Ruth | |
| 3,493,496 A | 2/1970 | Bray et al. | |
| 3,504,796 A | 4/1970 | Bray | |
| 3,506,037 A | 4/1970 | Hanson et al. | |
| 3,520,437 A | 7/1970 | Fleming et al. | |
| 3,720,235 A | 3/1973 | Schrock | |
| 3,760,951 A * | 9/1973 | Mansfield | 210/449 |
| 3,844,744 A | 10/1974 | Hausberg et al. | |
| 4,176,063 A | 11/1979 | Tyler | |
| 4,299,254 A | 11/1981 | Zahid | |
| D273,976 S | 5/1984 | Burrows | |
| D273,977 S | 5/1984 | Burrows | |
| D274,452 S | 6/1984 | Burrows | |
| 4,482,456 A | 11/1984 | Grayson | |
| 4,552,656 A | 11/1985 | Solomon | |
| 4,585,554 A | 4/1986 | Burrows | |
| 4,595,497 A | 6/1986 | Burrows | |
| 4,657,674 A | 4/1987 | Burrows | |
| 4,705,625 A | 11/1987 | Hart, Jr. | |
| 4,743,366 A | 5/1988 | Burrows | |
| 4,775,465 A | 10/1988 | Burrows | |
| 4,776,952 A | 10/1988 | Burrows | |
| 4,784,181 A | 11/1988 | Hilverdink | |
| 4,830,744 A | 5/1989 | Burrows | |
| 4,834,873 A | 5/1989 | Burrows | |
| 4,853,117 A | 8/1989 | Burrows | |
| 4,859,320 A | 8/1989 | Beall, Jr. | |
| 4,880,534 A | 11/1989 | Burrows | |
| 4,895,654 A | 1/1990 | Burrows | |
| 4,971,689 A | 11/1990 | Burrows | |
| 4,990,248 A | 2/1991 | Brown et al. | |
| 4,992,170 A | 2/1991 | Menon et al. | |
| 5,002,664 A | 3/1991 | Clack et al. | |
| 5,037,547 A | 8/1991 | Burrows | |
| 5,045,197 A | 9/1991 | Burrows | |
| 5,096,574 A | 3/1992 | Birdsong et al. | |
| 5,114,572 A | 5/1992 | Hunter et al. | |
| 5,128,035 A | 7/1992 | Clack et al. | |
| 5,132,017 A | 7/1992 | Birdsong et al. | |
| 5,143,601 A | 9/1992 | Slovak et al. | |
| 5,192,004 A | 3/1993 | Burrows | |
| 5,221,473 A | 6/1993 | Burrows | |
| 5,246,141 A | 9/1993 | Burrows | |
| 5,254,243 A | 10/1993 | Carr et al. | |
| 5,289,951 A | 3/1994 | Burrows | |
| 5,297,700 A | 3/1994 | Burrows et al. | |
| 5,307,958 A | 5/1994 | Burrows et al. | |
| 5,310,088 A | 5/1994 | Burrows | |
| 5,370,276 A | 12/1994 | Burrows | |
| 5,389,260 A | 2/1995 | Hemp et al. | |
| 5,390,826 A | 2/1995 | Burrows | |
| 5,435,909 A | 7/1995 | Burrows | |
| 5,449,093 A | 9/1995 | Burrows | |
| 5,527,450 A | 6/1996 | Burrows | |
| 5,580,444 A | 12/1996 | Burrows | |
| 5,672,272 A | 9/1997 | Baer | |
| 5,766,453 A | 6/1998 | Morellato et al. | |
| 5,906,225 A | 5/1999 | Stark et al. | |
| 6,076,557 A | 6/2000 | Carney | |
| 6,099,735 A * | 8/2000 | Kelada | 210/652 |
| 6,110,360 A | 8/2000 | Hart, Jr. | |
| 6,290,856 B1 | 9/2001 | Beall | |
| 6,764,595 B1 | 7/2004 | Halemba et al. | |
| 7,070,695 B2 | 7/2006 | Husain et al. | |
| 2004/0173624 A1 | 9/2004 | Carter | |
| 2005/0139530 A1 | 6/2005 | Heiss | |
| 2005/0167352 A1 | 8/2005 | Burrows et al. | |
| 2006/0000839 A1 | 1/2006 | Gremour et al. | |
| 2006/0113240 A1 | 6/2006 | Burrows et al. | |

FOREIGN PATENT DOCUMENTS

| | | |
|---|---|---|
| DE | 37 06 705 A1 | 9/1988 |
| DE | 4444350 A1 | 6/1996 |
| GB | 2 264 684 A | 9/1993 |
| JP | 10-30901 A | 2/1989 |
| SU | 386156 | 6/1973 |
| SU | 1089305 | 4/1984 |

* cited by examiner

REVERSE OSMOSIS FILTRATION SYSTEMS

CROSS-REFERENCE TO RELATED APPLICATION

This application claims the benefit of U.S. Provisional Patent Application No. 60/711,837 filed Aug. 26, 2005.

BACKGROUND OF THE INVENTION

1. Field of the Invention

The present invention relates to the field of reverse osmosis filtration systems.

2. Prior Art

Reverse osmosis water filtration systems pressurize one side of an appropriate membrane with source water, causing the water to slowly pass through the membrane, leaving impurities therein on the source water side of the membrane for flushing away by controlled flow of excess source water past the membrane. The filtered or product water passing through the membrane is accumulated in a storage tank having a flexible bladder separating the storage tank into a product water storage area and a squeeze water area. Normally when the product water storage tank area defined by the bladder is filled, the bladder lies flat against the tank wall. Now when the product water is to be dispensed, squeeze water is coupled to the region between the bladder and the tank wall. However, because the bladder is flat against the tank wall, it takes a moment for the squeeze water to seep between the bladder and the tank wall. Therefore there is an initial hesitation in squeeze water flow, and accordingly in product water pressurization, providing an undesired hesitation and uncertainty in the initial product water dispensing.

In addition to the storage tank and the reverse osmosis membrane, other components are also required, such as conventional source water filters and activated charcoal filters to remove chlorine from the water prior to the reverse osmosis membrane, a control valve to control operation of the system, and plumbing to connect the various elements and to provide a source water inlet, one or more product water outlets, and a drain outlet. While these components can be coupled together with conventional hose fittings and the like, such an arrangement tends to be a bit kludgy and labor intensive to assemble and service, and tend to be larger than necessary.

DETAILED DESCRIPTION OF THE PREFERRED EMBODIMENTS

Figure 1:
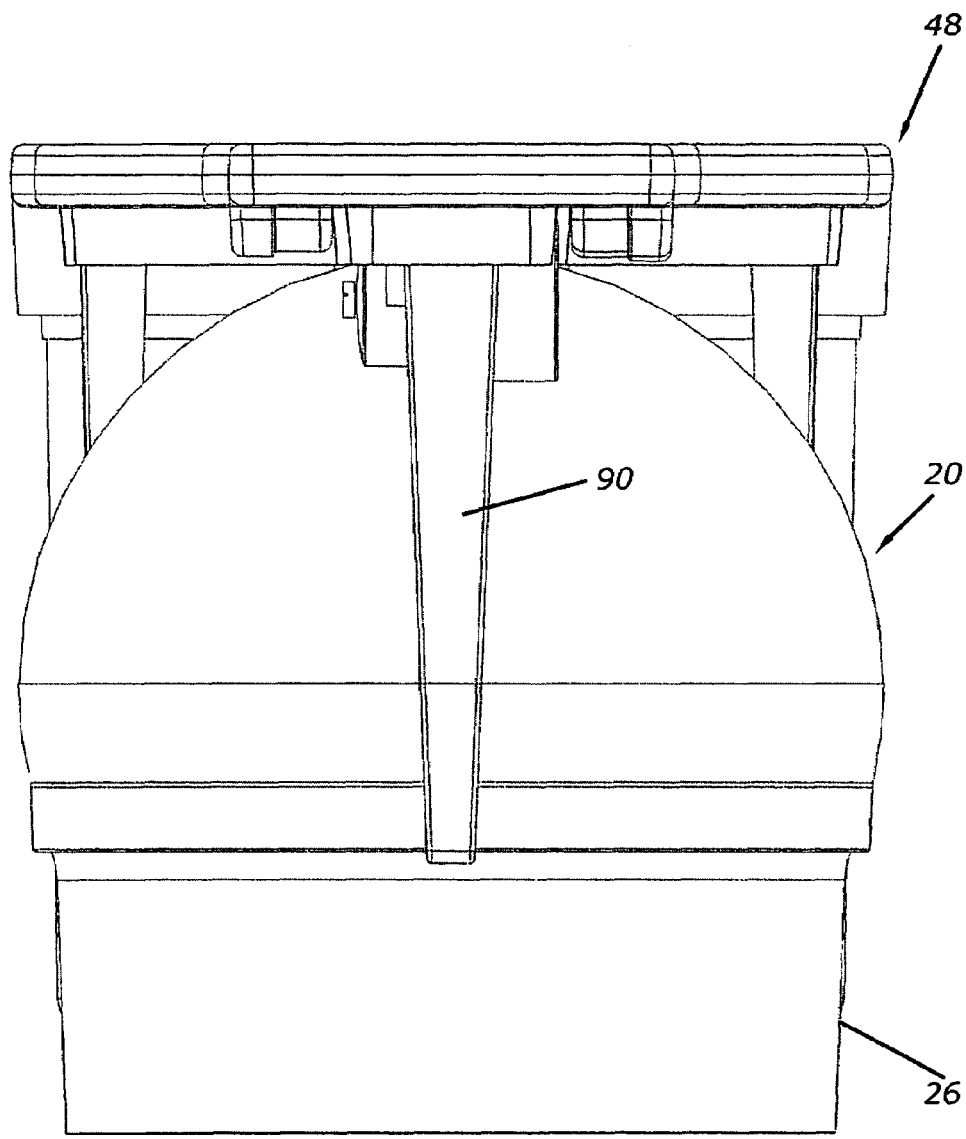
FIGS. 1 through 4 present a first end view, a first side view, a second side view and a bottom view, respectively, of one embodiment of the present invention.
Figure 2:
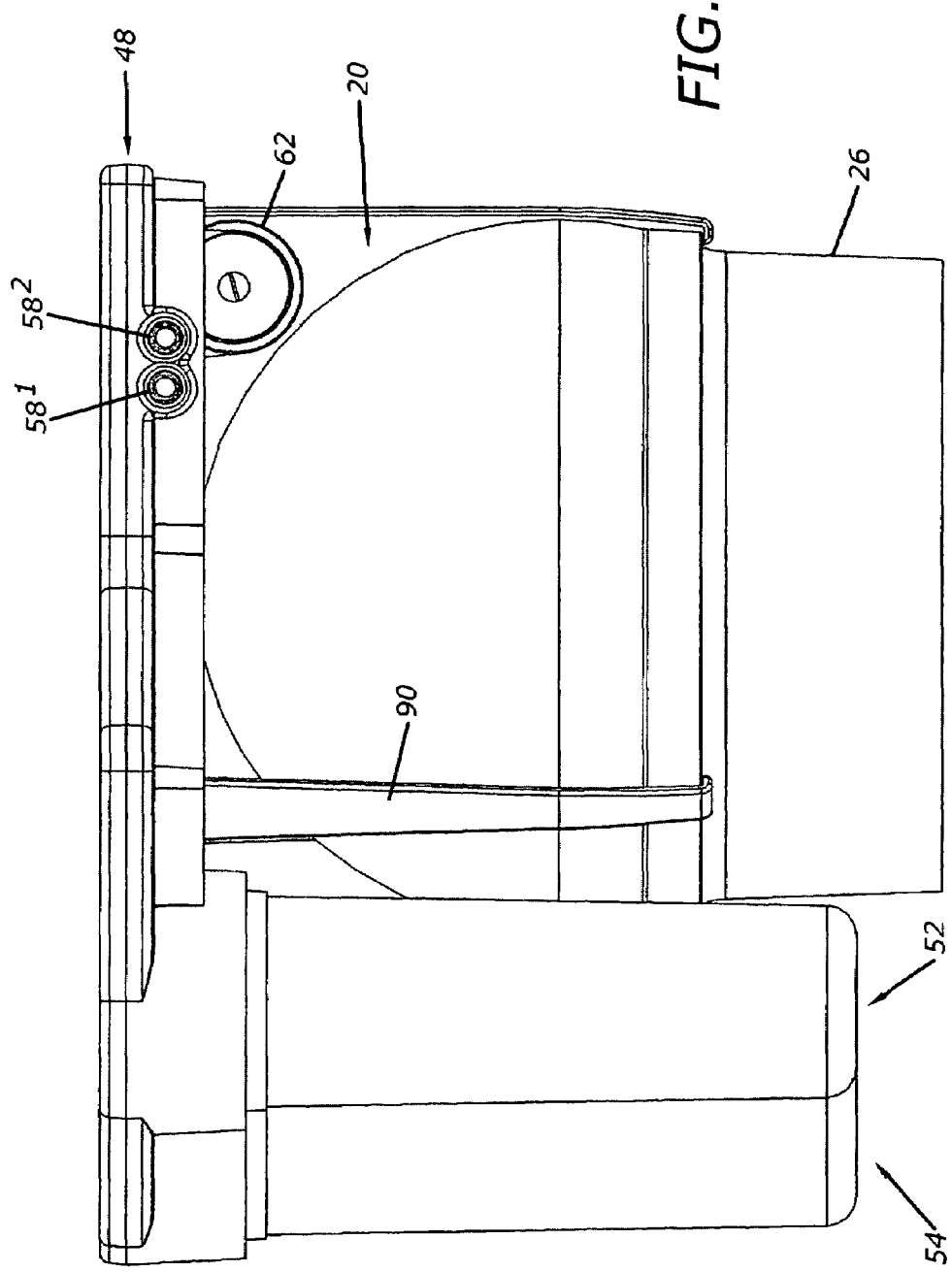
Figure 3:
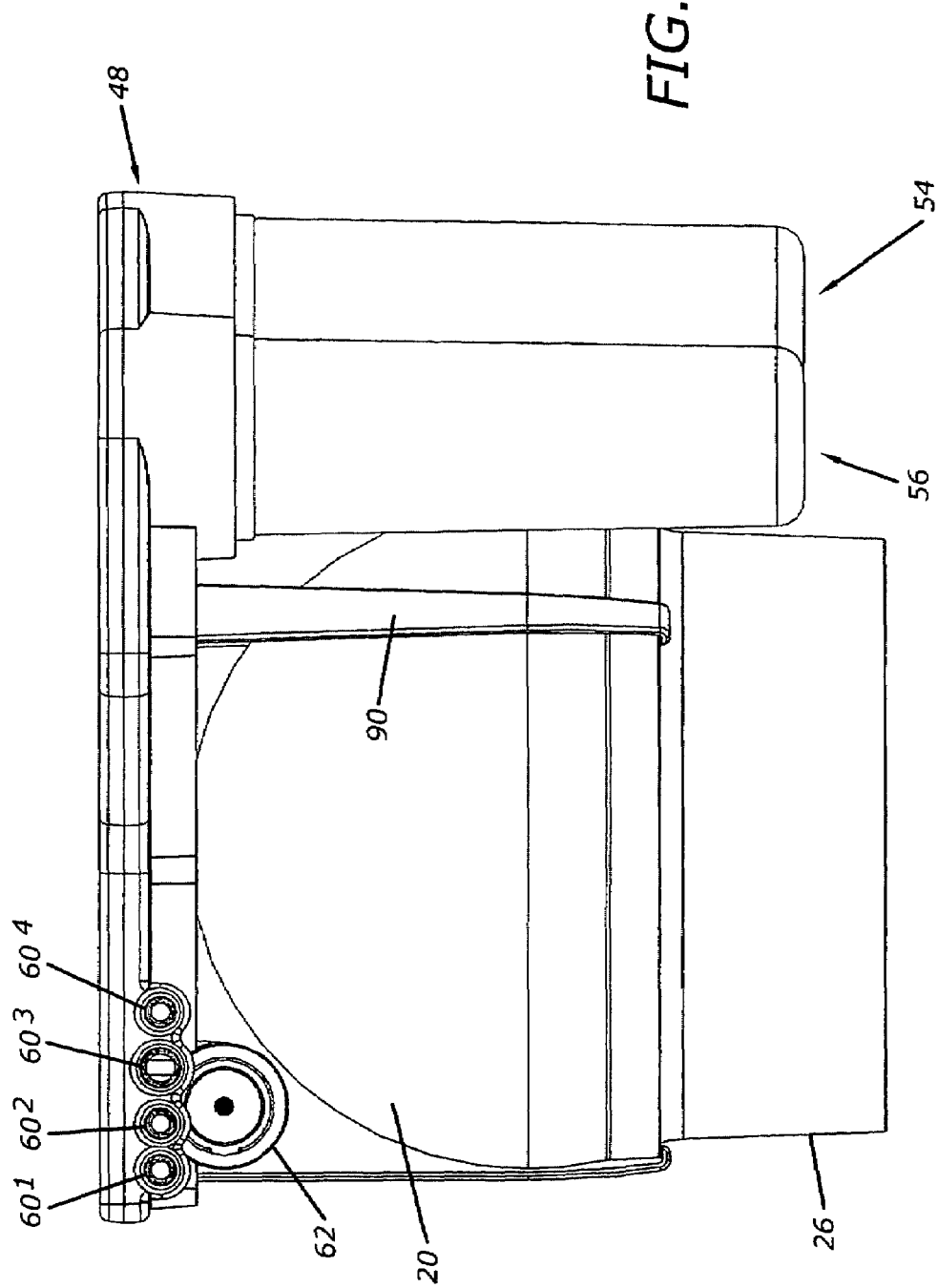
Figure 4:
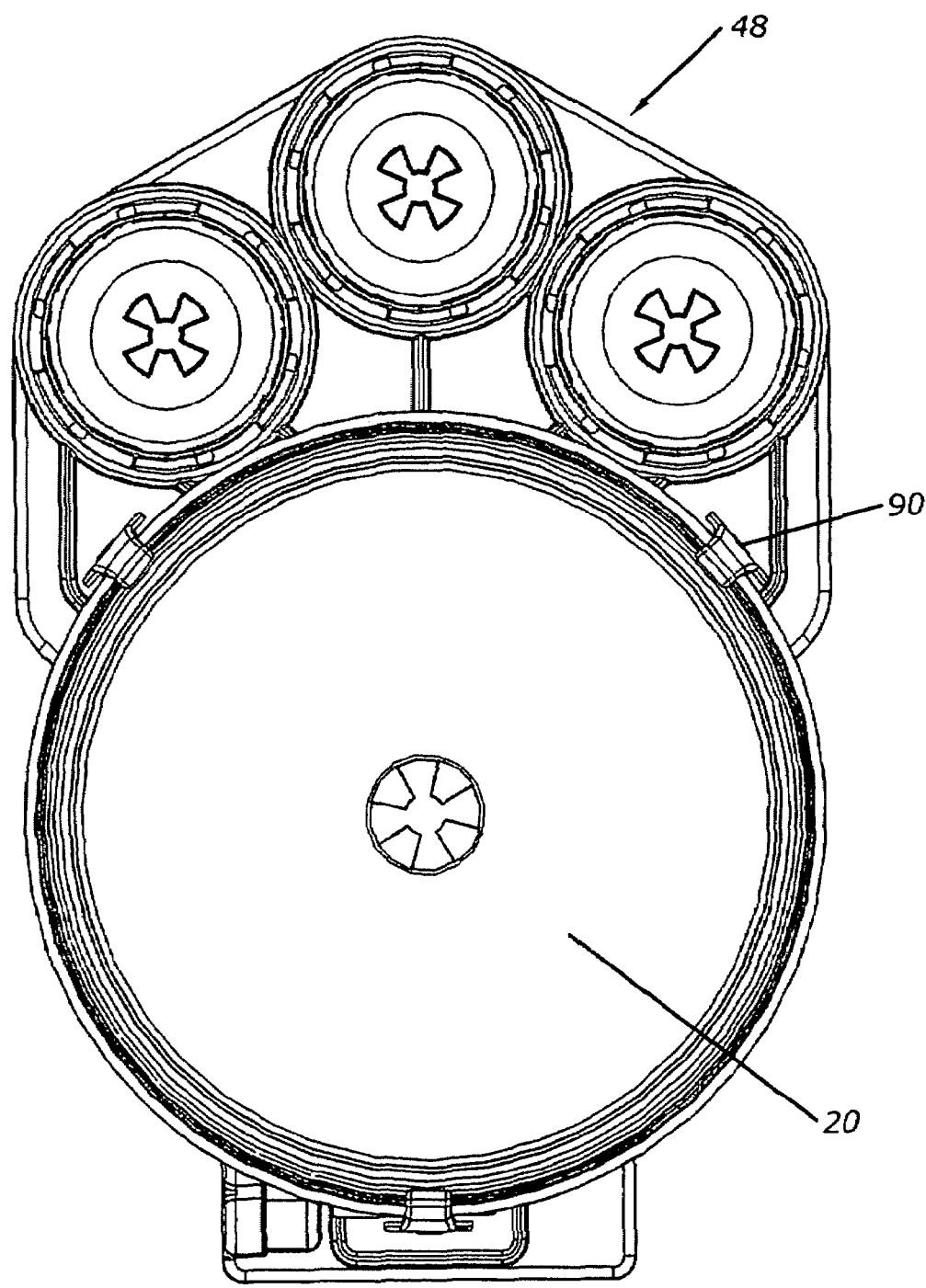

The present invention comprises integrated reverse osmosis filtration systems of a compact design having a minimum number of parts and easily connected and serviced, and suitable for use above or below a counter. An embodiment of the present invention may be seen in FIGS. 1 through 4. FIG. 1 is a first end view of one embodiment reverse osmosis filtration system of the present invention, FIG. 2 is a first side view, FIG. 3 is a second side view, and FIG. 4 is a bottom view. In FIG. 1, the main components that are visible are the storage tank for the storage of product water, generally indicated by the numeral 20, and a top plate assembly, generally indicated by the numeral 48. As shall subsequently be seen, the top plate assembly is a manifold assembly providing all water interconnections required within the system. In FIGS. 2 and 3, also visible are cartridges 52, 54 and 56 that contain a conventional filter, a reverse osmosis filtration membrane and an activated charcoal filter, respectively. Visible in FIG. 2 are two connections 58 to the outside world, and in FIG. 3, an additional four connections 60 to the outside world are shown. Four of these connections provide connections for the source water input, the membrane flush water and squeeze water output to drain, and two product water outputs to accommodate simultaneous connection to a dispensing tap and to an icemaker. Obviously, if the system is only used to provide tap water, the icemaker output is merely capped off. The additional two connections are a product water connection for connecting to an extra storage tank, if used, and a squeeze water connection for such an extra tank. These, too, would be capped off unless such an extra tank was in fact used. These connections are subsequently described in greater detail.

Also visible in FIGS. 2 and 3 is a control valve 62 that provides hydraulic control for the entire system. The control valve used in the preferred embodiment is in accordance with U.S. Pat. No. 6,110,360, the disclosure of which is hereby incorporated by reference. However, valves of other designs could be adapted for use with the present invention as desired.

Figure 5:
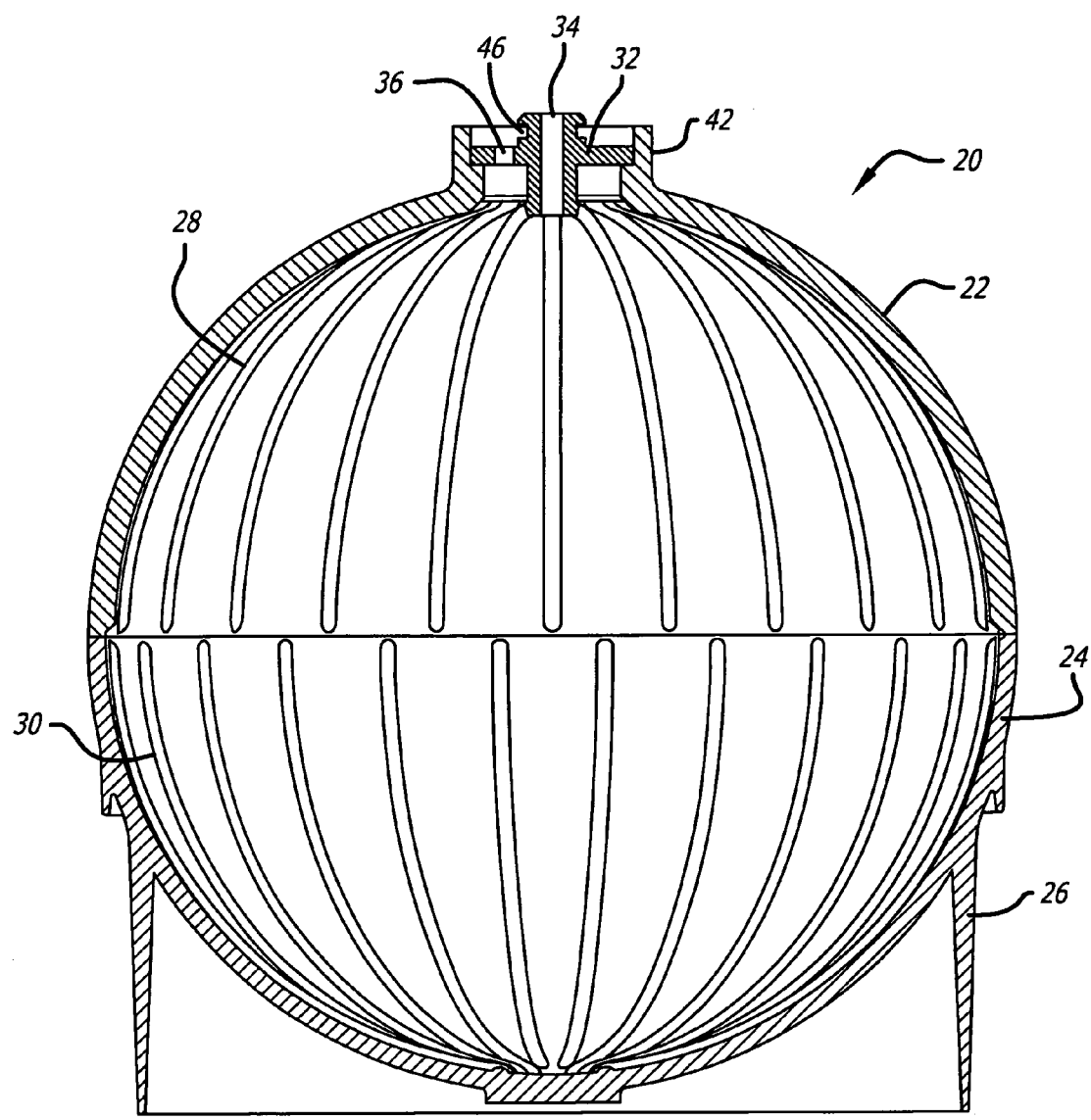
FIG. 5 is a cross section of a tank assembly in accordance with a preferred embodiment of the present invention.
Figure 6:
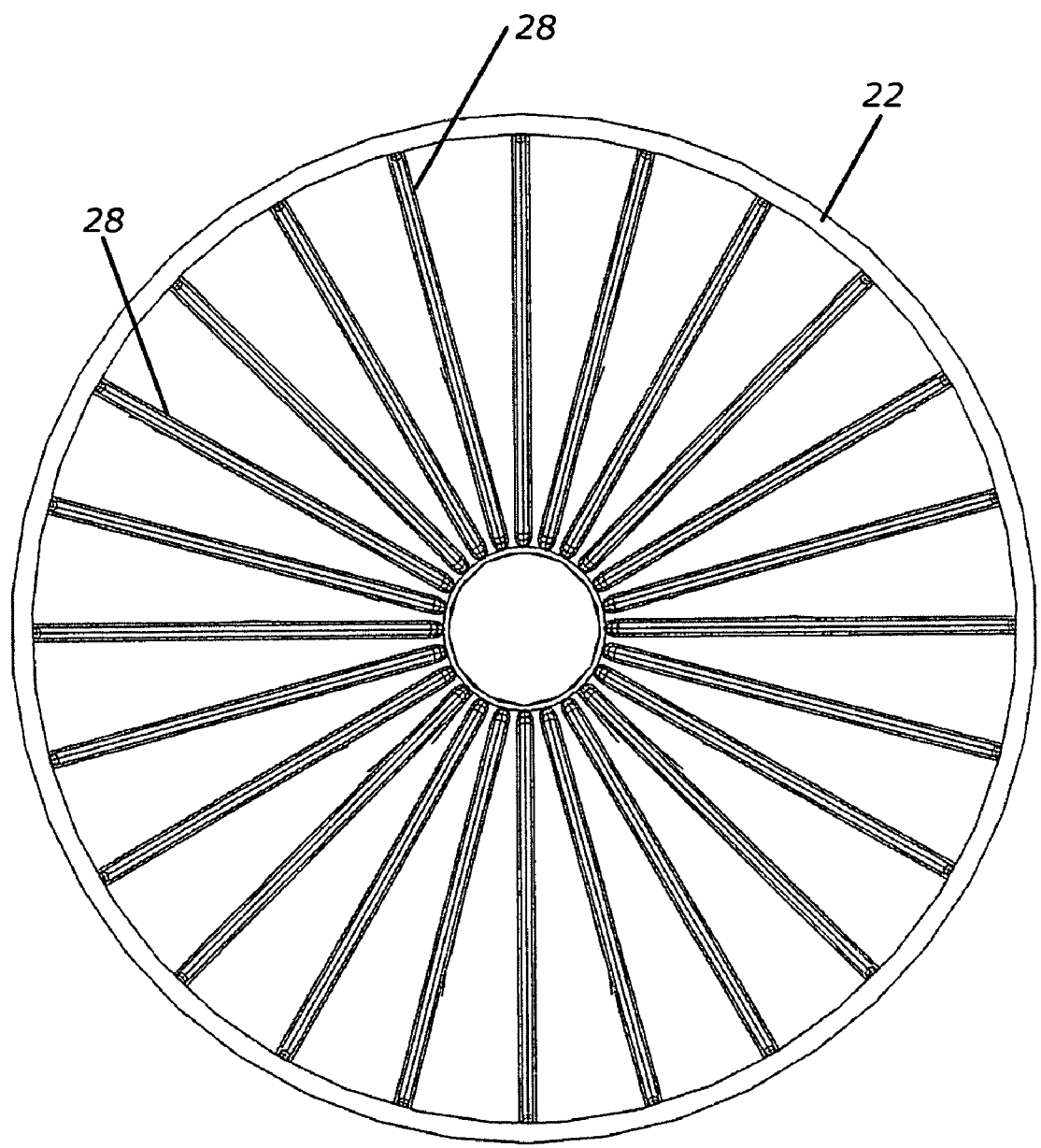
FIG. 6 is a view looking directly into the upper shell 22 of the embodiment of FIG. 5

As may be seen in FIG. 5, the storage tanks 20 of the preferred embodiment are manufactured from upper and lower injection molded shells 22 and 24, with the lower shell 24 having a hollow circular base 26 for support of the finished tank 20 on a flat surface. FIG. 5, being a cross-section of the tank, shows the ribs or protrusions 28 and 30 in the upper and lower tank shells 22 and 24, respectively. These ribs are rib-like protrusions integrally molded on the inside surface of the tank shells, the function of which shall be subsequently described. FIG. 6 is a view looking into the upper shell 22 providing a face view of the ribs.

Also shown in FIG. 5 is a top member 32 providing a central opening 34 for product water into and out of a bladder that will be placed within the tank, and a plurality of peripheral openings 36 for squeeze water to selectively pressurize the product water for dispensing purposes. In the preferred embodiment, the two tank shells 22 and 24 are spin welded together to provide a strong and permanent joining of the two members to define a substantially spherical inner surface interrupted primarily by the ribs just described.

Figure 7:
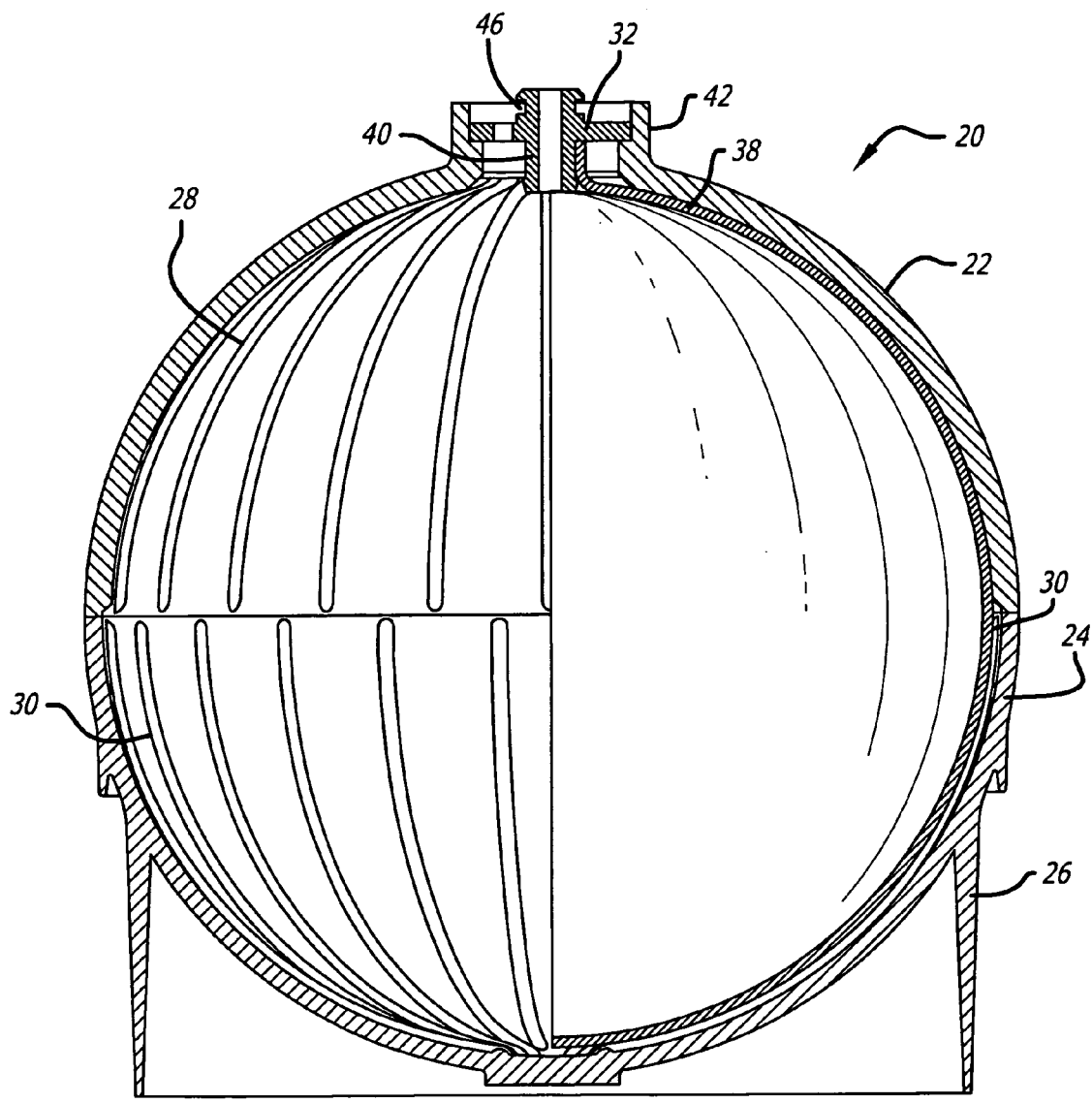
FIG. 7 is a cross section similar to that of FIG. 5, but with the bladder shown in the right side of the Figure.

Now referring to FIG. 7, the left side of the Figure shows the same cross-section as FIG. 5, with the right side of the Figure showing the cross-section of the tank after bladder 38 has been installed. Bladder 38 is preferably a spherical blow molded bladder of any flexible material conventionally used for reverse osmosis filtration storage tank bladders, and has a neck that fits over downward protrusion 40 of member 32 and is sealed with respect thereto. As may be seen in the lower part of FIG. 7, ribs 30 locally hold the bladder away from the wall of shell 24, with ribs 28 shown in FIG. 5 doing the same with respect to shell 22 at other positions around the inner periphery of the shell. In that regard, the relative angular orientation of the two shells 22 and 24 is not relevant, and need not be controlled. The ribs provide a squeeze water flow path around a filled bladder, eliminating any delay or hesitation in fully pressurizing the bladder for pressurized product water dispensing upon opening of a valve on a product water outlet.

Figure 8:
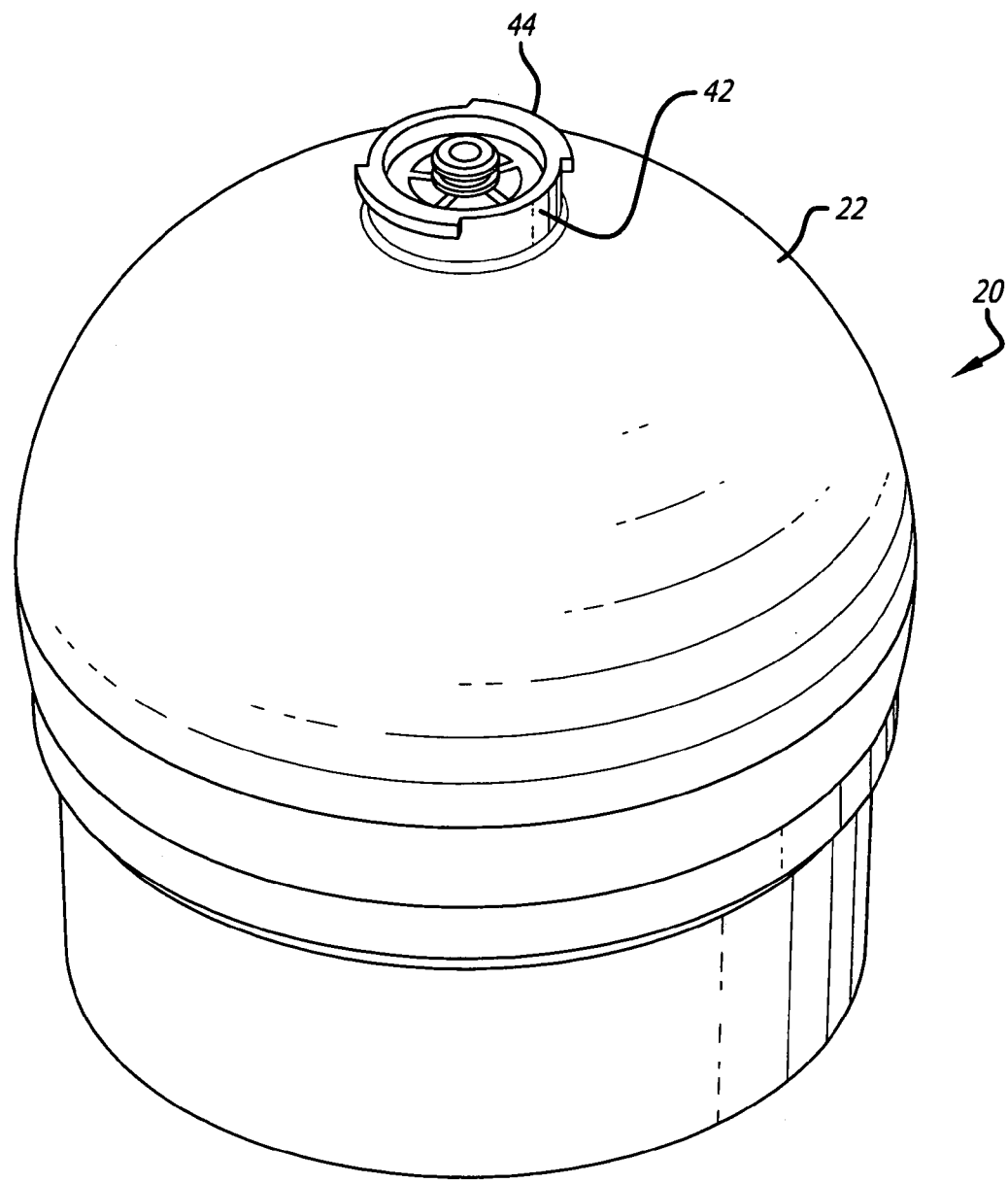
FIG. 8 is a perspective view of the final tank assembly of the preferred embodiment.

A perspective view of the finished assembly of the preferred embodiment may be seen in FIG. 8. As shown therein, in the preferred embodiment the top 42 of the upper shell 22 has a form of bayonet-type connector 44 which will fasten the top 42 of the tank to the rest of the reverse osmosis filtration system assembly, with an O-ring in O-ring groove 46 (see FIGS. 1 and 2) sealing the product water connection and an O-ring fitting within the inner periphery of the top 42 sealing against that inner periphery to prevent leakage against squeeze water, particularly when pressurized. This assembly will be described in greater detail later herein.

In operation, during filtration, the squeeze water region between the bladder 38 and the inner periphery of the tank 20 is vented to drain so that the product water passing through the reverse osmosis membrane will accumulate in the interior of the bladder. Thus the bladder will essentially fill with product water, displacing most of the squeeze water out to drain. However the ribs 28 and 30 on the inner periphery of the tank hold the bladder locally away from the inner wall of the tank to leave flow passages through ports 36 to these regions around the ribs. Consequently when the bladder is full and the system shuts off, these flow passages at each side of the ribs will remain. Now when product water is called for, such as by the opening of a faucet or the turning on of an ice maker valve, and the system pressurizes the squeeze water, the squeeze water is free to flow into the region between the bladder 38 and the inner periphery of the tank, pressurizing the product water substantially immediately for dispensing purposes. Consequently, the tank of the present invention is easily injected molded and spin welded and has the further advantage of eliminating the hesitation and uncertainty in the initial dispensing of product water from a full storage tank.

In the preferred embodiment, ribs are disposed on the interior surface of the tank to define flow paths for the initial inflow of squeeze water. Alternatively, similar depressions could be used in the tank wall, but are not preferred, as they weaken the tank, requiring a somewhat thicker average wall thickness for the tank, adding expense. As further alternatives, however, the ribs do not need to run throughout the inner surfaces of the tank, or be circumferentially oriented, but at least should emanate from the squeeze water connection to the tank. Each "rib" also could be in the form of two raised areas adjacent each other, thereby defining another squeeze water flow path between the raised areas. Similarly, the tank shells may define an interior other than spherical, and/or may be assembled other than by spin welding, though spin welding is preferred as providing a very inexpensive manufacturing technique that provides a weld strength substantially as strong as the molded material itself.

Figure 9:
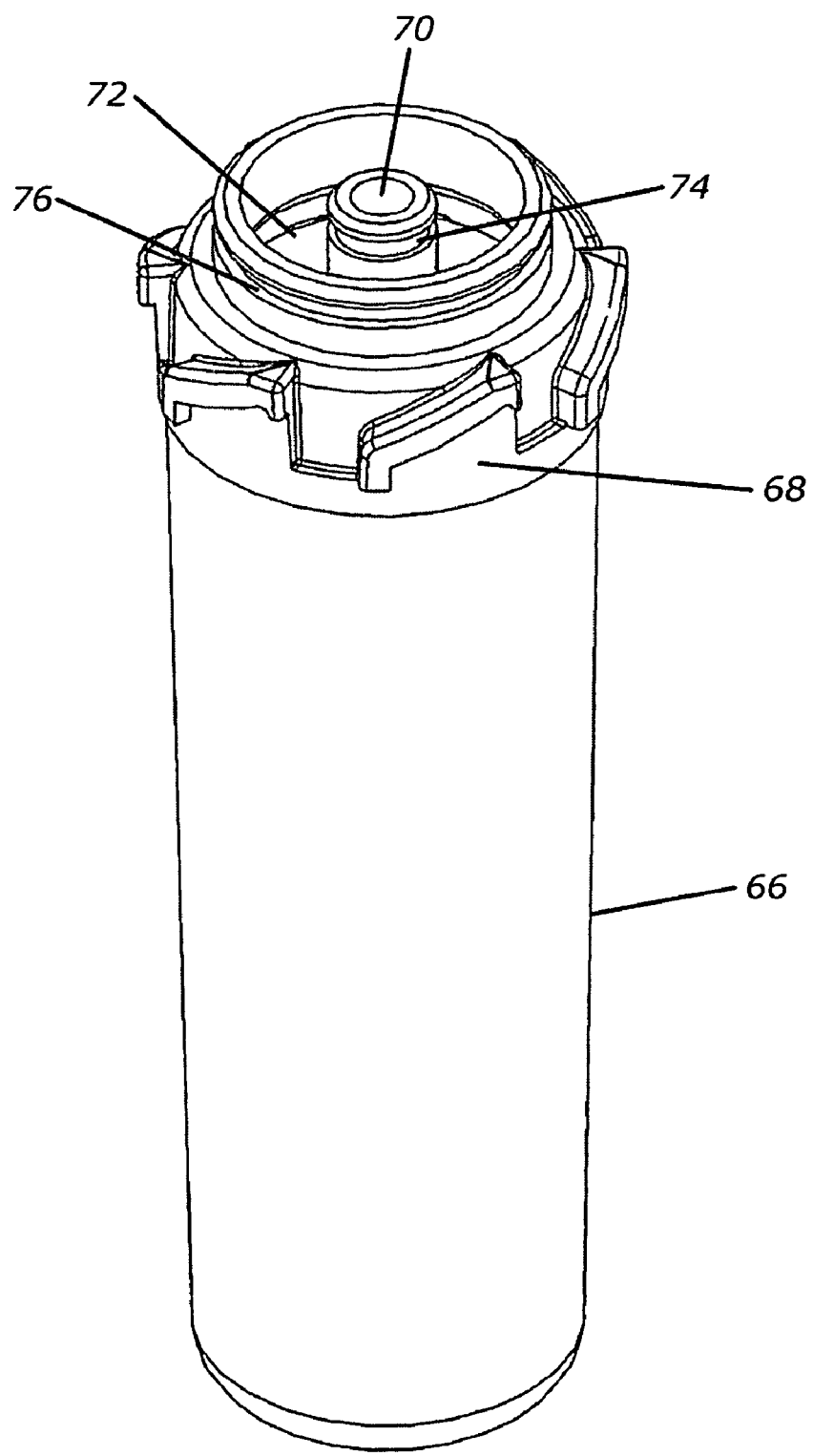
FIG. 9 is a perspective view of one of the filter cartridges.

Now referring to FIG. 9, a perspective view of the filter cartridges 52 and 56 may be seen. These cartridges are comprised of a molded body 66 with a molded top cap 68 having an upward projecting bayonet-type mechanical connector. In the final assembly, water flow into and out of the cartridges is provided through opening 70 and through annular area 72, with the filter cartridges being sealed with respect to the final assembly by O-rings in O-ring grooves 74 and 76. It will be noted that the bayonet connector on member 68, preferably spin welded to the body 66, is a six element bayonet connector rather than a typical two element connector, which provides for seating and locking of the cartridges in the final assembly with only a minor rotation of the canisters.

Figure 10:
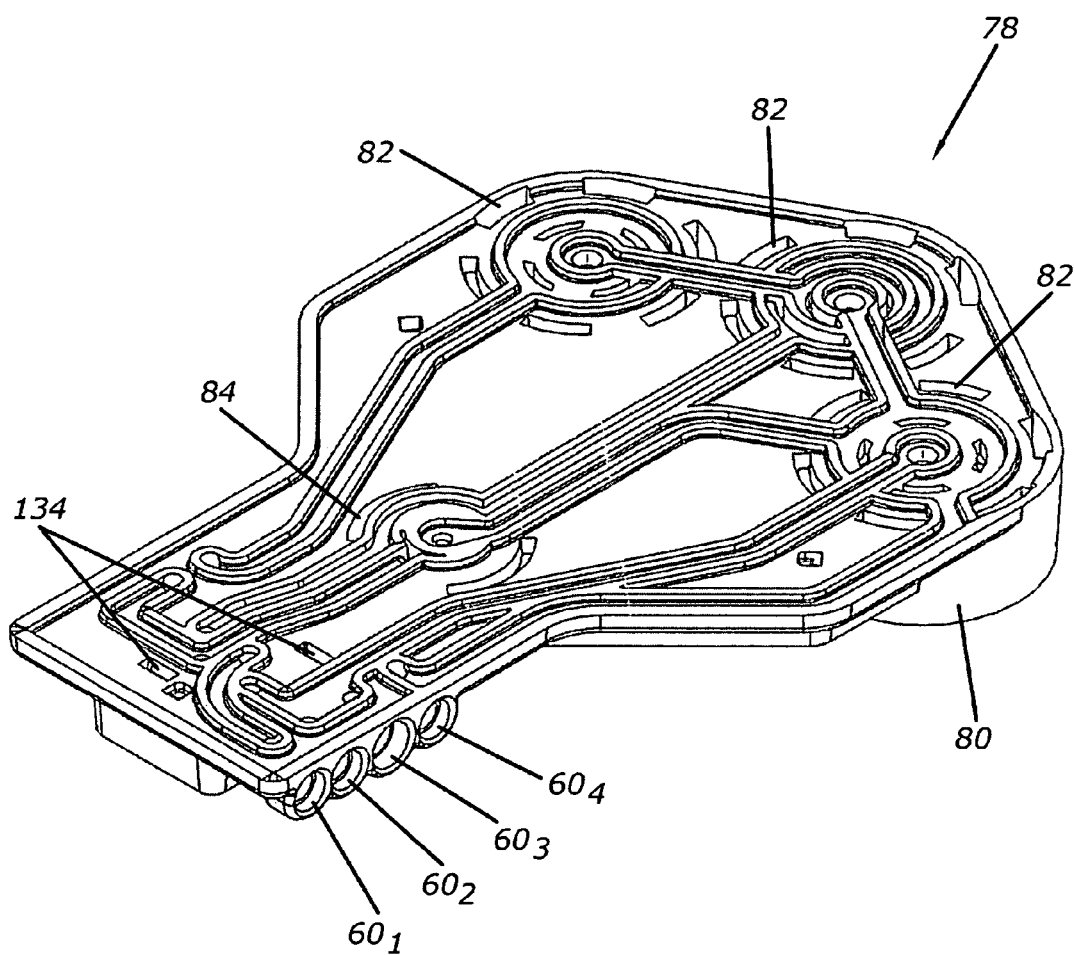
FIGS. 10, 11 and 12 are a top perspective view, a top face view and a bottom view, respectively, of the lower manifold plate.
Figure 11:
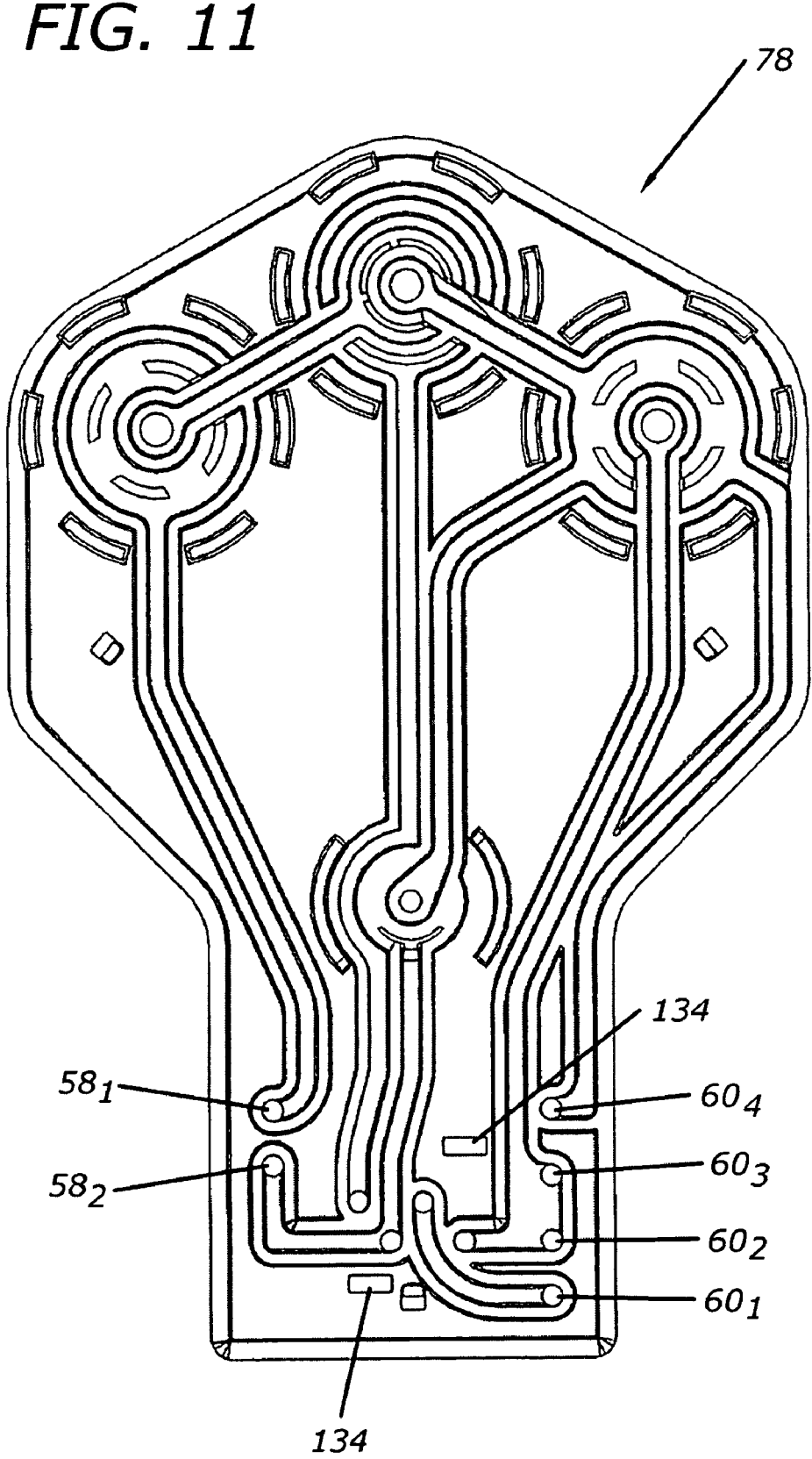
Figure 12:
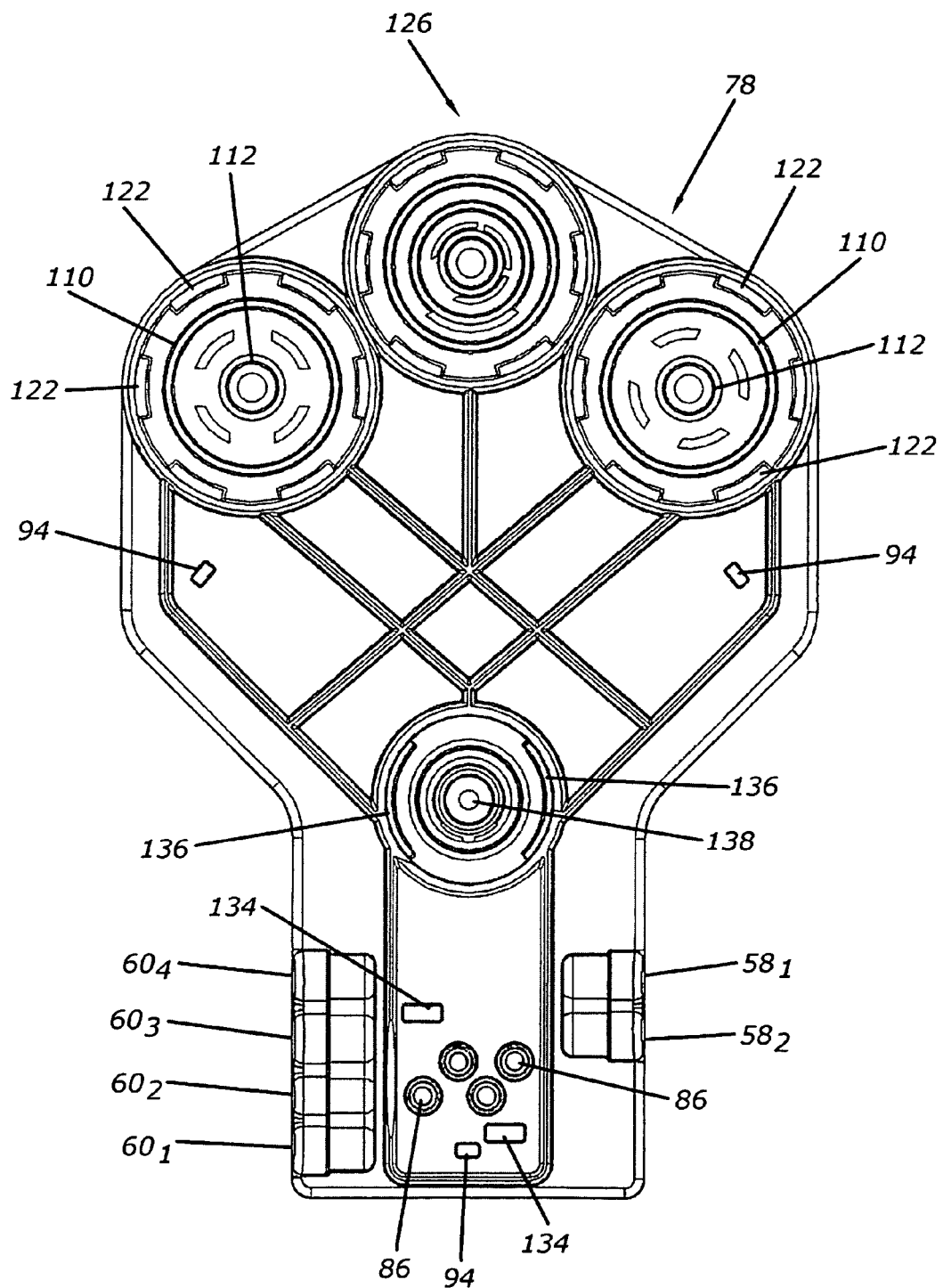

The top plate assembly of FIGS. 1 through 4, as stated before, provides all of the required manifolding for interconnection of the water flow paths within the system. This top plate assembly 48 is comprised of two manifold plates, which in the preferred embodiment are hot-plate welded together. The lower manifold plate, generally indicated by the numeral 78, may be seen in FIG. 10, with a face view of the top of that plate being shown in FIG. 11. FIG. 10 shows one of the receptacles 80 for the filter cartridge 56 (FIG. 3). Also visible are the mating connectors 82 for the bayonet connector on the filter cartridges and the mating bayonet connector 84 for the product water storage tank 20 (FIGS. 1 through 3). Finally, also visible in FIG. 10 are four of the six external connections 60 (FIG. 3) hereinbefore described. FIG. 12 is a bottom view of the lower manifold plate of FIGS. 10 and 11 showing, in essence, the receptacle for the filter cartridges and for connection to the water storage tank, as well as fluid connections 86 to the control valve 62 (FIGS. 2 and 3) hereinbefore described.

Figure 13:
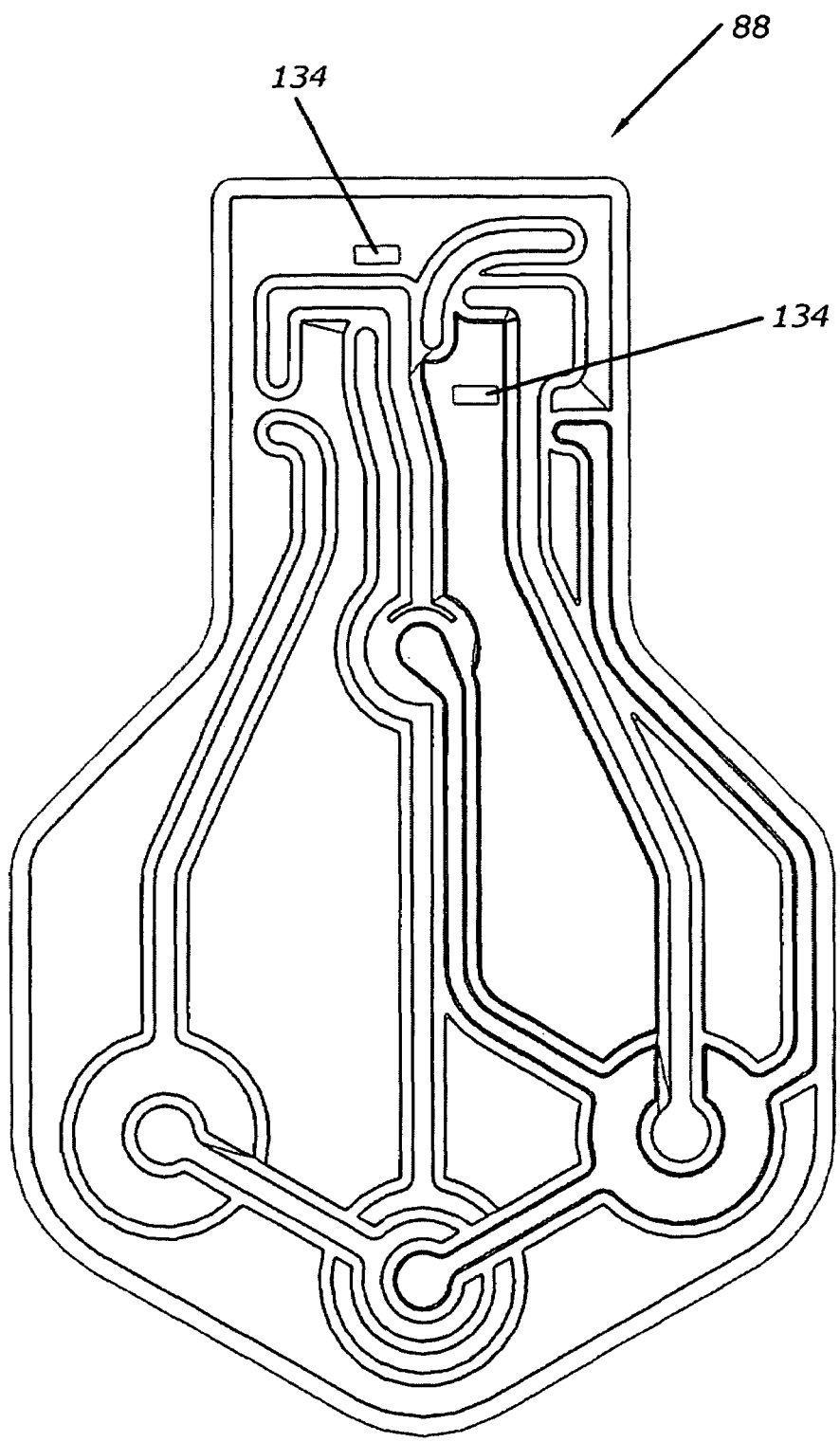
FIGS. 13 and 14 are bottom and top face views, respectively, of the upper manifold plate.
Figure 14:
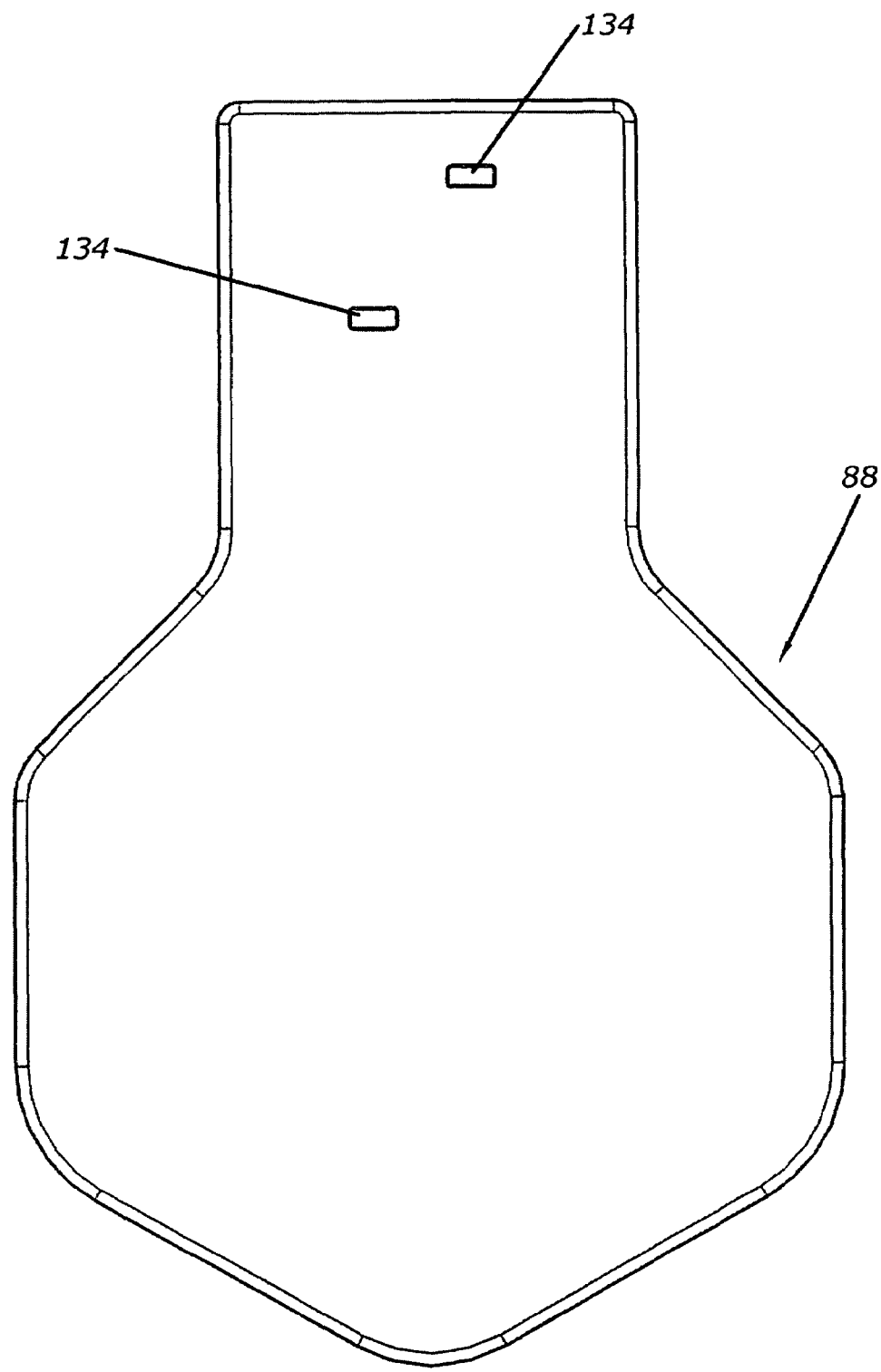

The bottom of the upper manifold plate 88 of the manifold assembly may be seen in FIG. 13, with the top of the upper manifold plate 88 being shown in FIG. 14. As may be seen in FIG. 13, the flow passages in the lower surface of the upper manifold plate 88 essentially replicate the flow passages defined in the top of the lower manifolding plate 78 shown in FIG. 10. Accordingly, when the two plates are hot welded together, the assembly provides all of the manifolding required for the system.

Figure 15:
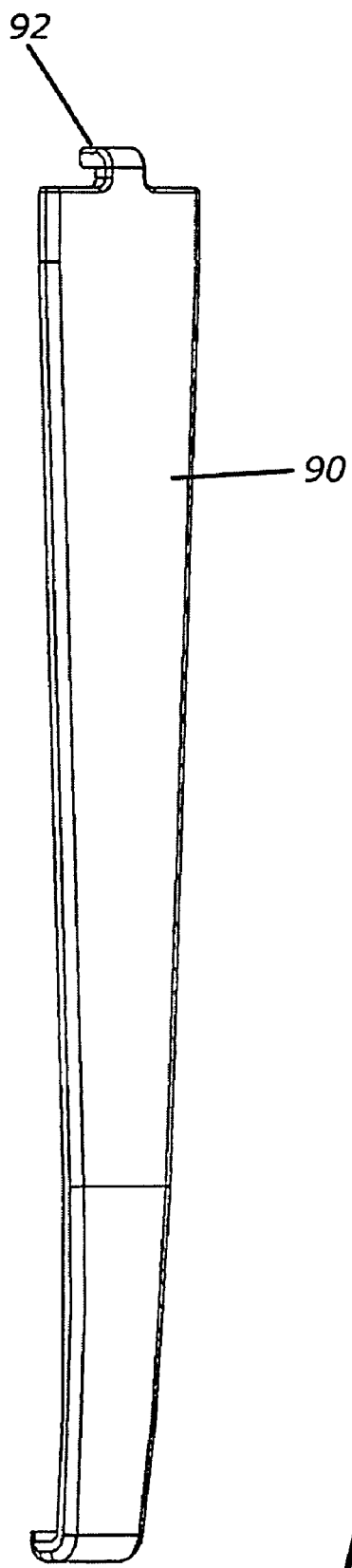
FIG. 15 is a perspective view of support members for further support of the product water storage tank.
Figure 16:
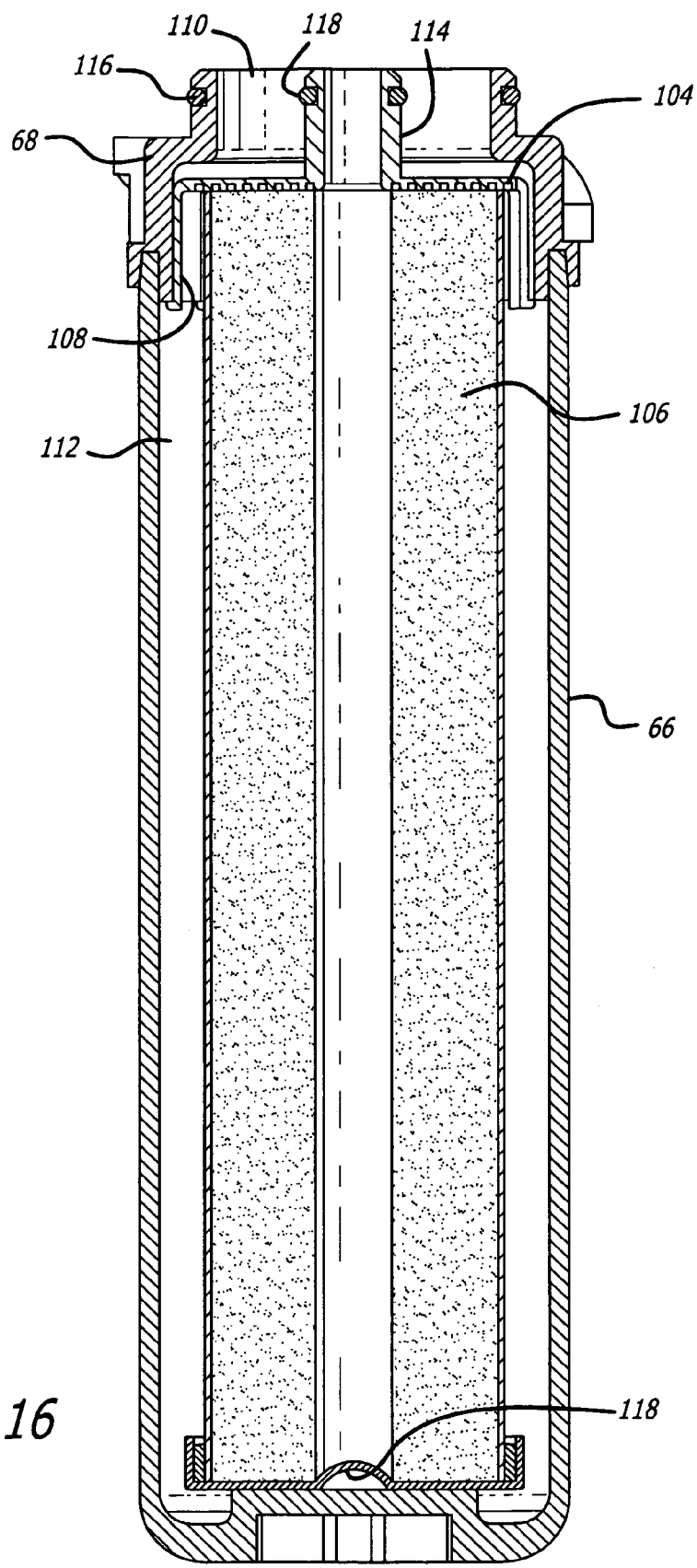
FIGS. 16 through 20 and 24 illustrate the construction of a typical filter cartridge.

Once the subassemblies are completed, the assembly of the reverse osmosis water filtration unit is simply a matter of mounting the control valve 62 (FIGS. 2 and 3) and attaching the water tank 20 and the filter canisters 52, 54 and 56 to the top plate assembly using the bayonet connectors. To provide extra stability for the storage tank 20, three support members 90 shown in FIG. 15 are used to provide further support for the tank, the support members having an upper tab 92 for hooking through openings 94 (FIG. 12) in the lower manifold plate 78 and also snapping under a lip provided in the lower tank shell of tank 20, as may be seen in FIGS. 1 through 4. The lower circular base 26 on the tank 20 provides a stand for the entire assembly, with the six water connections hereinbefore referred to readily accommodating the attachment of a local or remote faucet, as well as supply and drain lines, so as to be readily used as an above-counter unit or as a below-counter unit, as desired.

FIGS. 16 through 20 and 24 show filter enclosure details, most of which are common to filters 52, 54 and 56 (FIGS. 2 and 3). Each filter has an injection molded body 66 with a cap 68 spin welded thereto. Entrapped within this assembly is a spacer member 104 (see also FIG. 24) that centers the upper end of filter element 106 while providing a flow path between fingers 108 from port 110 to region 112 around the periphery of the filter element 106. The spacer member 104 also defines a central port in fluid communication with the inner diameter of the filter element 106 through a protrusion 114, with O-rings 116 and 118 sitting against the inner diameters of protrusions 110 and 112 in the lower manifold plate 78 (see FIG. 12). The bottom end of filter element 106 is centered by protrusion 118 at the bottom center of body 66. Thus for assembly purposes, the filter element 106 is dropped in position, spacer member 104 placed thereover, then cap member 68 placed over that assembly and spin welded to the body 66 to complete the assembly, except for the O-rings 116 and 118.

Figure 17:
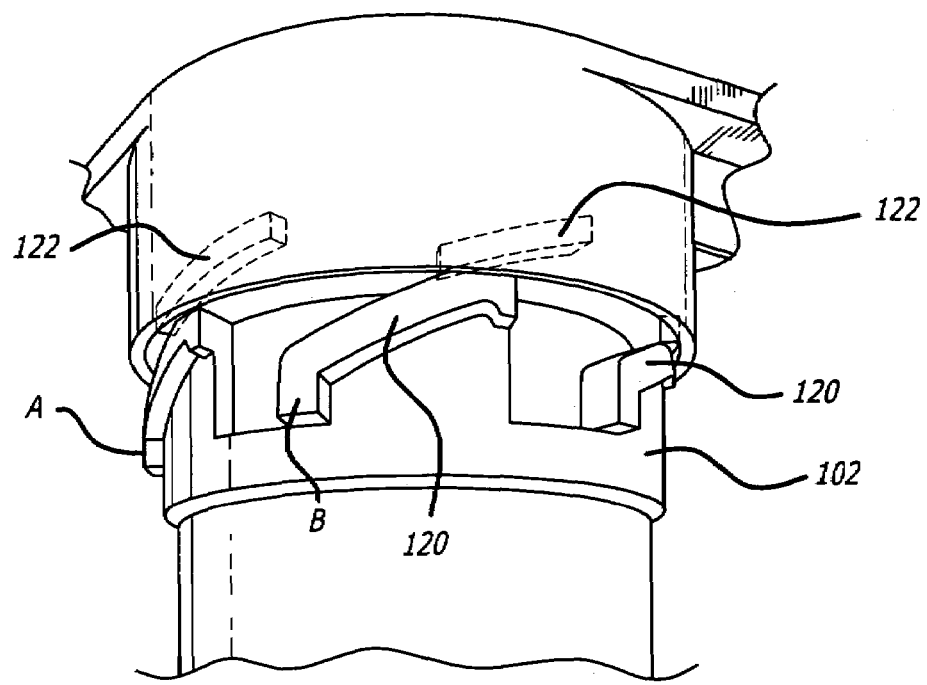
Figure 18:
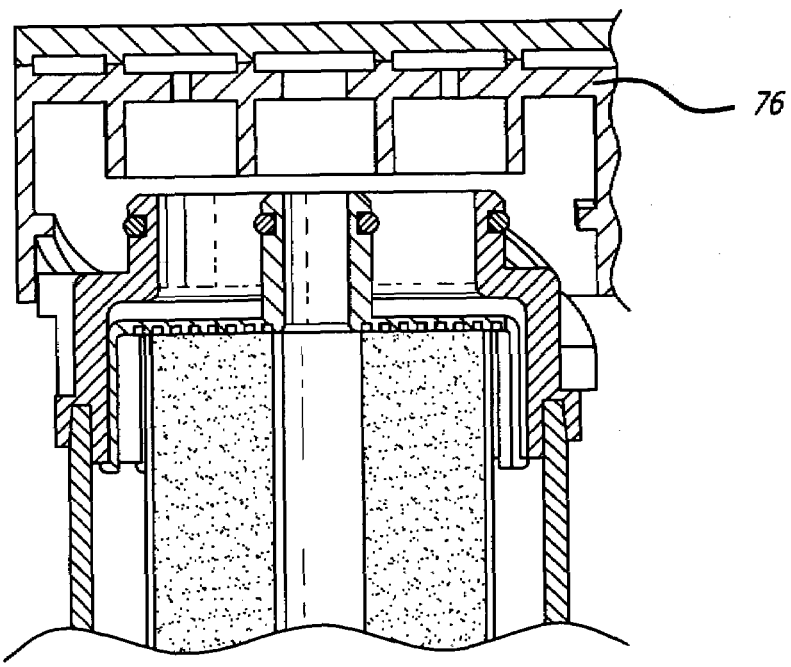
Figure 19:
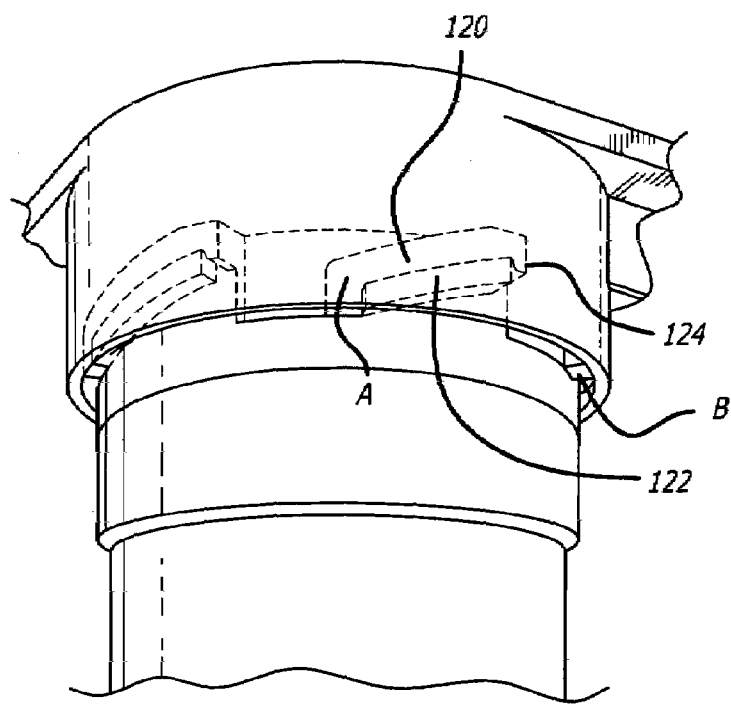

As may be seen in FIG. 17, the cap 68 has protrusions 120 thereon, in its preferred embodiment a total of six such protrusions, which together with inward projecting protrusions 122 on the lower manifold plate 78 (see FIG. 12) form a bayonet type connector. This connector allows rotation in a first direction as if screwing the filter onto the lower manifold plate with conventional screw threads until the leading lip 124 on each of protrusions 120 slips past the upper end of the inward projections 122, at which time the filter cartridge will lock in place in a sort of snap action caused by the combination of the absence of a further longitudinal motion of the filter and the elastic deflection of O-rings 116 and 118. The use of four or more such projections allows at least four starting positions for the filters, and rapid locking in place with limited rotation of the filters.

Figure 20:
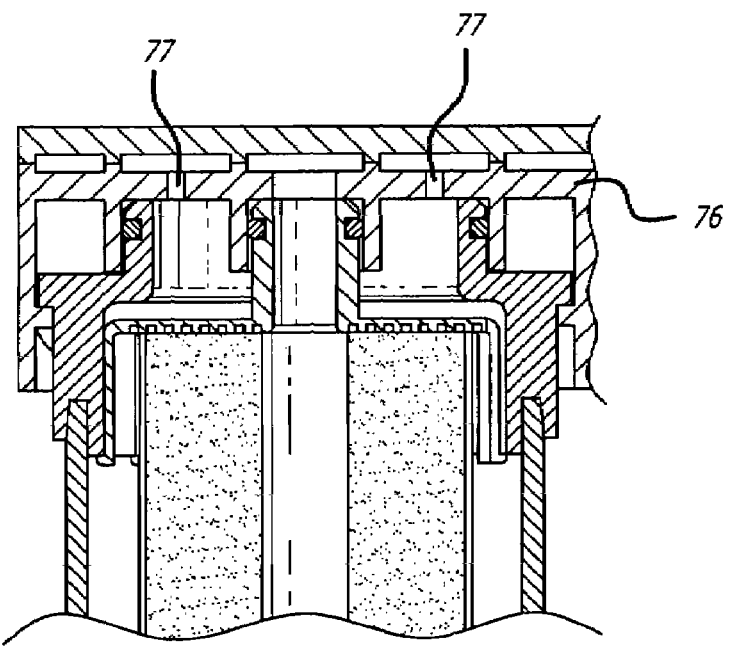

When the filters are rotated in the opposite direction, protrusions 120 will be rotated until they engage the lower surface of inward projections 122, thereby forcing the filter downward with respect to the lower manifold plate 78. In the preferred embodiment, the protrusions forming the bayonet connector are configured so that the screw type action of the bayonet connector pulling the filter cartridge into position with respect to the lower manifold plate 78 will begin before any forcible engagement of O-rings 116 and 118 with the circular protrusions on the lower manifold plate 78 begin. This allows the screw action to forcibly engage the O-rings, a far more convenient action than trying to simply force the filter longitudinally upward to engage the O-rings. Similarly, the bayonet connectors are configured so that on rotation to unscrew a filter from the lower manifold plate 78, the bayonet connector will force a sufficient separation between the filter and the lower manifold plate 78 to forcibly disengage the O-rings 116 and 118 before reaching the end of the screw type action. This is illustrated generally with respect to FIG. 18, generally illustrating the beginning position of a filter for engagement purposes, or alternatively, the ending position of a filter after being disengaged, FIG. 20 illustrating the relative position of the filter and the lower manifold plate 78 when the filter is in its mounted position. In FIG. 20, ports 77 appear small in the Figure, though are actually 4 arc segments providing a much larger flow area than is apparent from the Figure.

The reverse osmosis filter cartridge 54 (see FIGS. 2 and 3) has an identical bayonet type connection to the lower manifold plate 78 as just described. It differs, however, in that three concentric inlet ports are provided, one for a raw water inlet, one for product water outlet and the third for a waste water outlet. See for instance the connections on the lower manifold plate 78 shown in FIG. 12.

Figure 21:
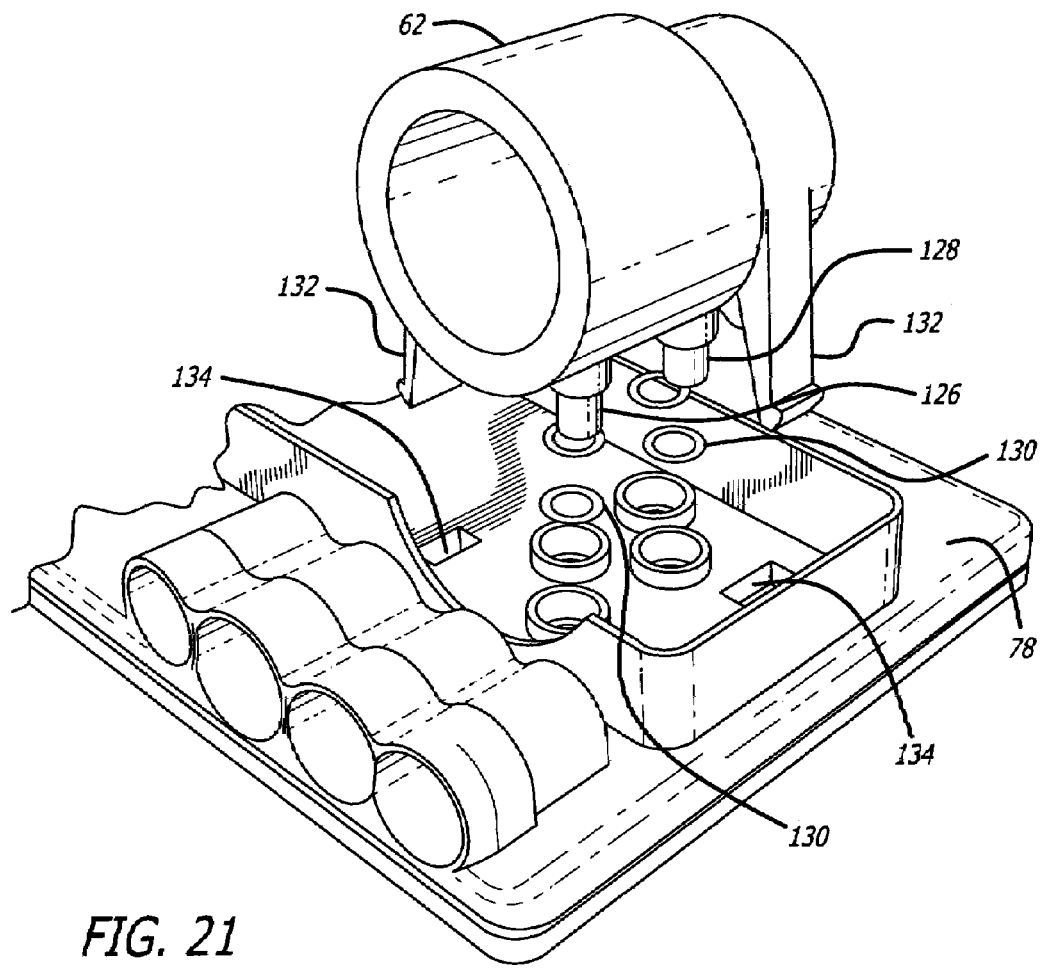
FIGS. 21 and 22 illustrate the mounting of the control valve.
Figure 22:
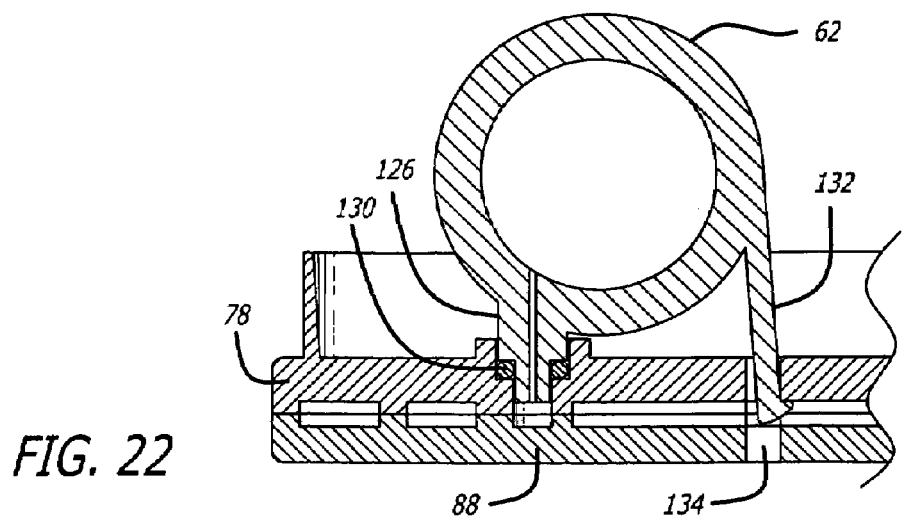

Now referring to FIGS. 21 and 22, the mounting in the control valve 62 of the preferred embodiment may be seen. In these Figures, only the body of control valve 62 is shown, though the complete control valve is shown in FIGS. 2 and 3, and is in accordance with U.S. Pat. No. 6,110,360 as previously mentioned. The body of control valve 62 has four ports thereon extending away from the body, two of which ports 126 and 128 may be seen in FIG. 21 and one of which port 126 may be seen in FIG. 22. The port shown on FIG. 2 is a restricted port for waste water, the other three ports having a much larger opening for substantially unrestricted flow therethrough. The four ports have O-rings 130 thereon which seal between the ports in the underside of the lower manifold plate 78, as illustrated in FIG. 22. The body of the control valve has two projections 132 integral therewith which snap through cooperatively disposed opening 134 in the lower manifold plate 78 to retain the control valve in the assembly. Accordingly assembly of the control valve to the next assembly is simply a matter of placing the O-rings in position and snapping the valve into position, not requiring the use of any tools, etc. In the event removal of the control valve 62 is ever required, openings 134 are provided in the upper manifold plate 88 (see FIGS. 13, 14 and 22), facilitating the use of a screwdriver or a pair of screwdrivers to release the control valve 62 from the assembly.

Figure 23:
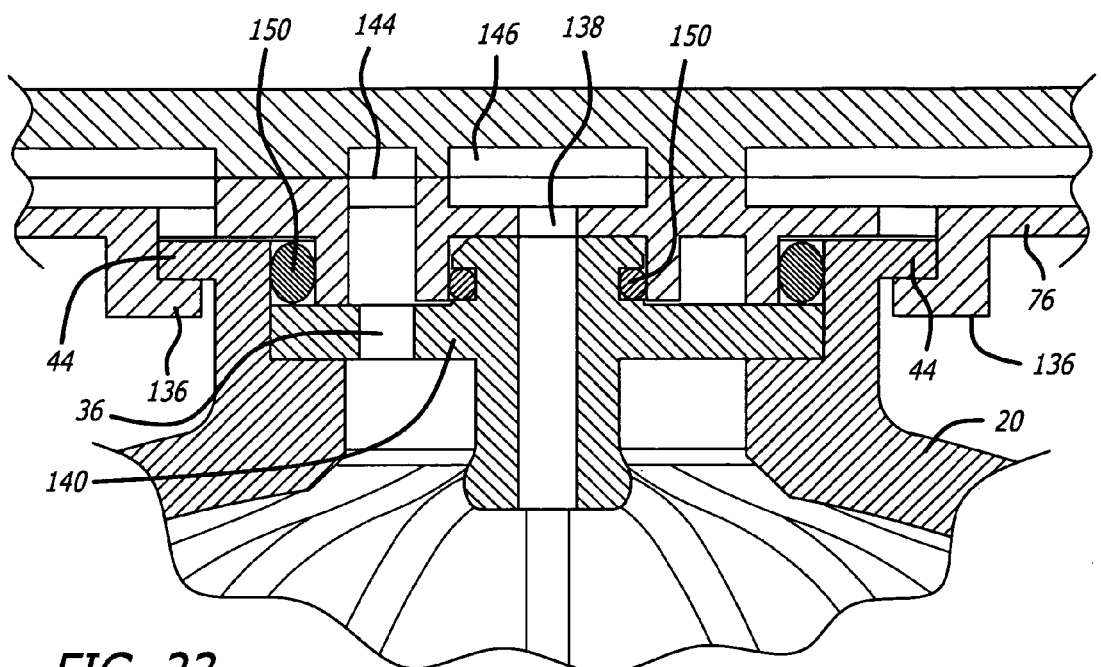
FIG. 23 is a cross section illustrating the mounting of the water storage tank to the rest of the assembly.
Figure 24:
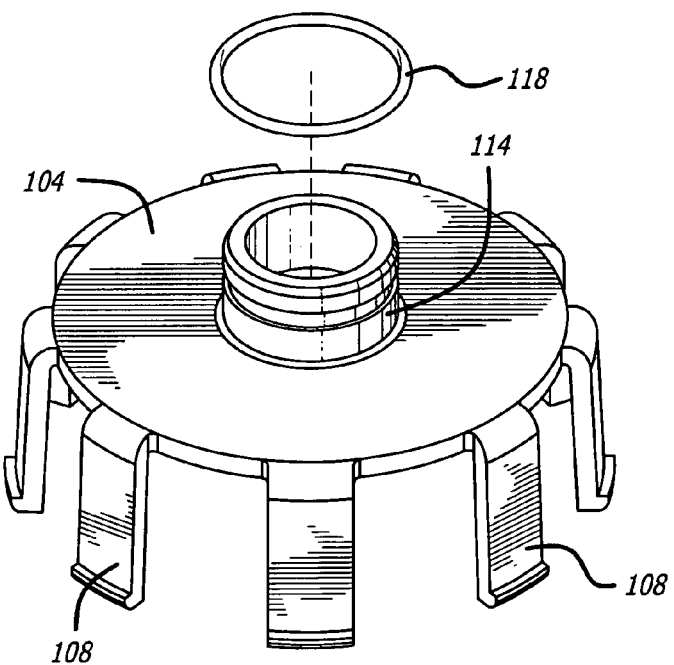

Now referring to FIG. 23, details of the manner of attachment of the water storage tank 20 (see also FIGS. 1 through 5) may be seen. The lower manifold plate 78 includes two inward projecting flanges 136 (see also FIG. 12) in the form of approximately 90° arc segments around a center port 138 in the lower manifold plate 78. The water storage tank has outward projecting flanges 44 (see also FIG. 8) so that the water storage tank may be assembled to the rest of the assembly by simply placing the storage tank in position and rotating the same 90° with respect to the rest of the assembly.

Pressed within the top of the storage tank 20 is an insert member 140 defining a central port aligned with port 138 in the lower manifold plate 78 and spaced apart ports 36 around the periphery thereof. Ports 36 provide communication for the squeeze water from manifold region 144 to the outside of the bladder in the water storage tank 20, whereas the central port 138 is in communication with the manifold region 146 for the product water. Sealing of these ports is by O-rings 148 and 150.

Having now described the general construction of the present invention, the manifolding defined by the upper and lower manifold plates 88 and 78 may be traced with the aid of FIGS. 2, 3, 10, 11 and 12. For this purpose, two of the six ports for connection to the outside world are labeled $58_1$ and $58_2$ in FIG. 2, and the other four labeled $60_1$ through $60_4$ in FIG. 3. That labeling may be seen in FIG. 12 and some of the labeling seen in FIG. 10. For clarity, connections to those ports shown in FIG. 11 also have the same labeling, though it should be understood that as shown in FIG. 11, these connections, though in communication with the ports to the outside world, are actually fluid connections to the internal manifold defined by the upper and lower manifold plates. The raw water inlet port is port $58_1$, with the manifolding directing the raw water to filter 52 (FIG. 2). After the water passes through the filter the manifolding directs the water to the outside of the RO filter element in filter 54, with product water going to the outside periphery of the charcoal filter element in filter 56 and to the central port of the storage tank 20. Also, after passing through the charcoal filter the product water is available on product water outlet ports $60_2$ and $60_3$. In that regard, two such ports are provided in the preferred embodiment, one for connection to a dispenser and one for connection to an ice cube maker. Port $60_4$ is also coupled to the center port on the storage tank 20 and is connectable to an auxiliary storage tank, if desired. In that regard, squeeze water for pressurizing the product water in the storage tank for dispensing purposes is also coupled to port 58.2 for coupling to the squeeze water connection of an auxiliary tank, if used. If not used, ports 58$_2$ and 60$_4$ are simply blocked off. Finally, port 60$_1$ is the wastewater outlet port.

The control valve 62 responds to operating conditions to control the water filtering and dispensing processes. In particular, when not dispensing and when the storage tank 20 is not full of product water, the control valve couples the raw water inlet through the filter 52 to the reverse osmosis membrane in filter 54, at the same time venting squeeze water and waste water to the waste water outlet. When the pressure in the product water storage tank increases, indicating that the tank is full, the wastewater will be shut off. When a valve coupled to one of the outlets 60$_2$ and 60$_3$ opens, the pressure drop will cause the control valve to couple the raw water inlet to the squeeze volume around the membrane in the product water storage tank to pressurize the same for dispensing through the respective outlet port. Consequently, the system is self-activating, shutting off all raw water flow once the product water storage tank 20 is full, thereby using no more water for operation of the system than necessary. Also the dispensing of product water by pressurizing the product water storage tank allows the system to be mounted on a counter with its own dispensing valve and decorative enclosure, or mounted below the counter to deliver product water to a remote faucet or ice cube maker on demand.

Figure 25:
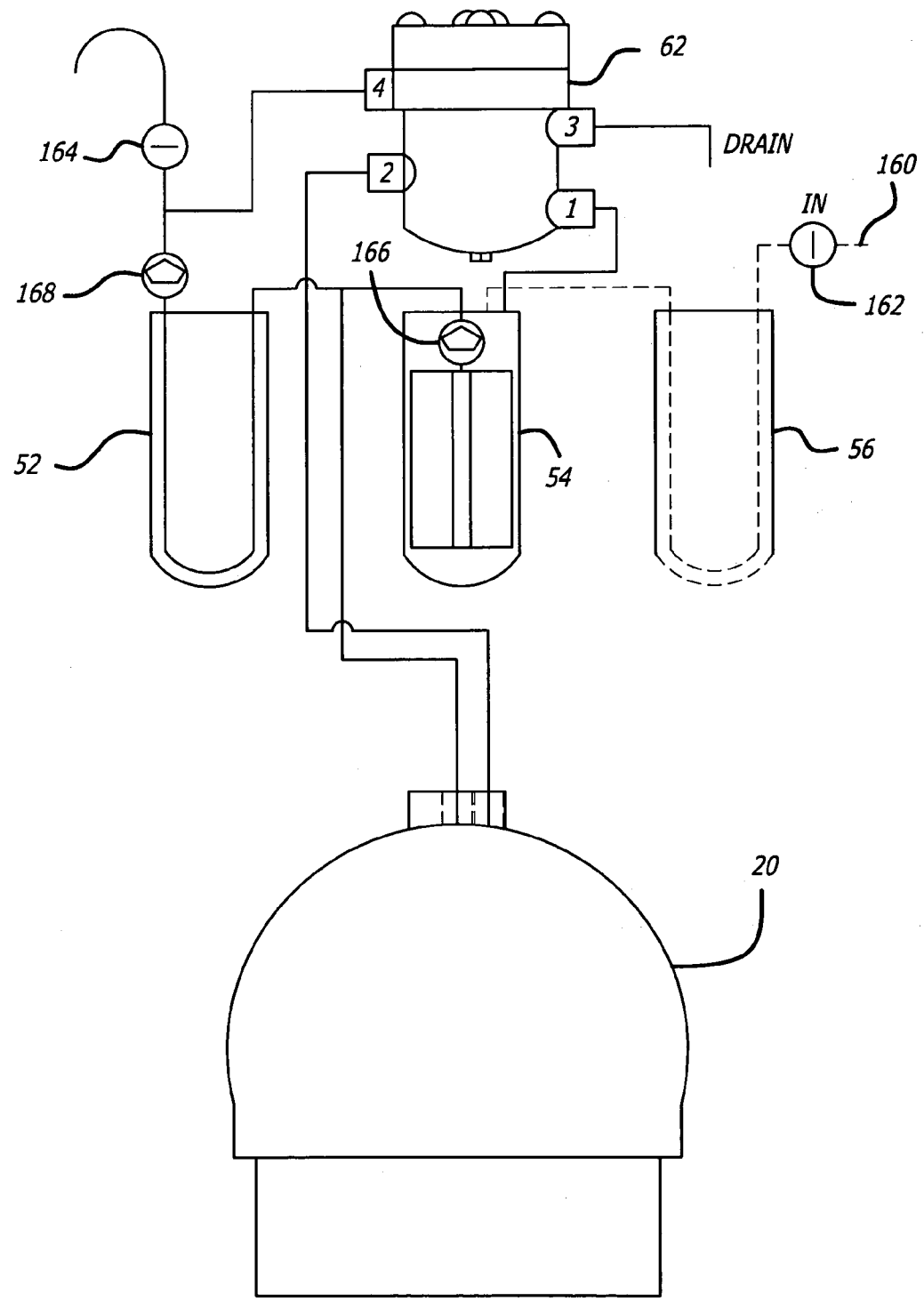
FIG. 25 is a diagram of an exemplary system in accordance with the present invention.

A diagram of an overall system may be seen in FIG. 25. The filter 52, preferably a combined fabric and carbon filter, is connected to a source of raw water 160, preferably through a dedicated shutoff valve 162. The outlet of filter 52 is coupled to the inlet of the reverse osmosis filter 54, with the product water thereof being coupled to the inlet of carbon filter 56 and to a product water storage tank 20. The waste water outlet for reverse osmosis filter 54 is coupled to port 1 of valve 62. The squeeze water connection for the storage tank 20 is coupled to port 2 of valve 62, with port 3 being coupled to a drain and port 4 being coupled to the product water output line prior to the dispenser (or ice cube maker or other product water utilization means) valve 164.

FIG. 25 does not include the additional product water and squeeze water connections for a remote storage tank, and for the purposes of this Figure, assumes that such connections are not available or have been sealed off. Also shown in this Figure are check valves 166 and 168 in the product water outlet of filters 54 and 56, respectively. These check valves, not shown in the other Figures, are small check valves in the outlet ports of these filters, allowing one-way flow as shown in FIG. 25, but preventing flow in the opposite direction. Check valve 166 prevents pressurizing the inner diameter of the reverse osmosis filter element when the outer diameter is not pressurized.

The four states of the control valve 62 are shown in FIGS. 25 through 28. The body assembly 170 of the control valve includes various O-rings for sealing against a two diameter piston 172, which is free to slide back and forth within the body assembly 170 in response to various pressures thereon. The body assembly 170 includes a throttling screw 174 that can allow for restricted flow between ports 1 and 2 through passage 176 and the narrow annular passage around the throttling screw, depending on the position of the piston 172.

Figure 26:
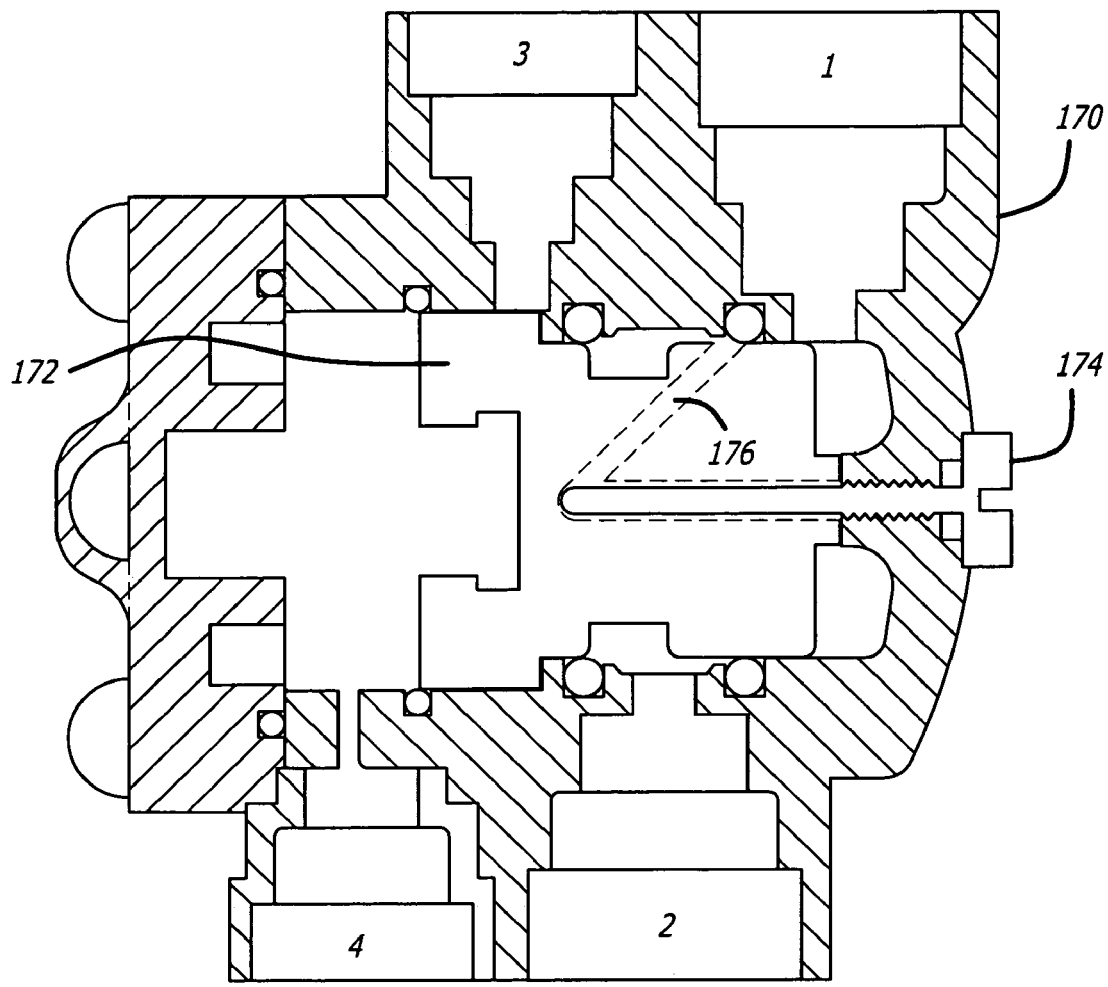
FIGS. 26 through 29 illustrate the various stages of operation of the control valve used in the preferred embodiment of the present invention.

FIG. 26 shows the control valve with the piston 172 in an at rest position. This would represent the condition existing when no product water is being dispensed and the water storage tank 20 is full of product water. Product water pressure through port 4, at or near raw water pressure and acting against the larger end of piston 172, forces the piston 172 to the rightmost position against the waste water pressure in port 1, also substantially equal to a raw water inlet pressure on line 160. In this position, waste water flow through port 1 and passage 176 is blocked, squeeze water flow through port 2 is blocked and any flow to port 3, the drain, is blocked. Thus all water flow is shut off.

Figure 27:
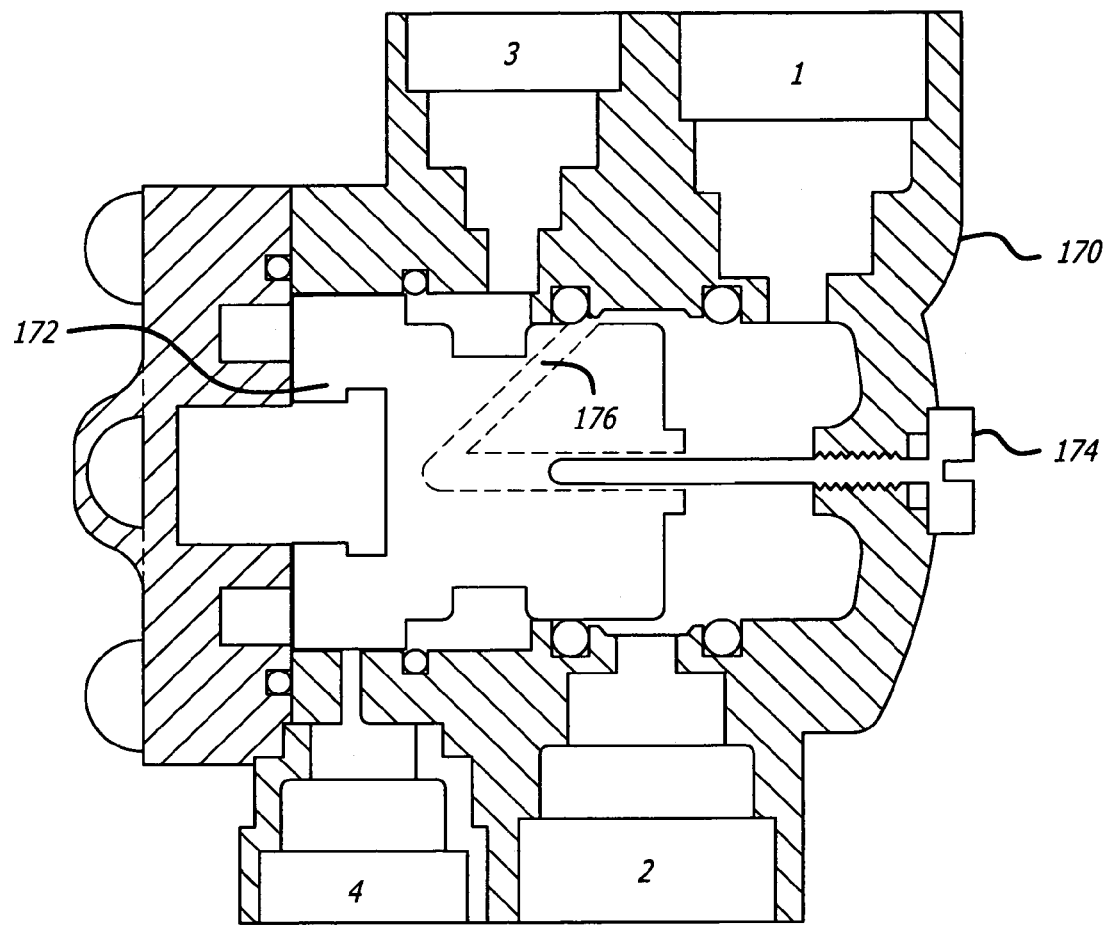

When a dispensing valve 164 is opened, pressure of the product water drops. Now the waste water pressure in line 1 is adequate to overcome the product water pressure on port 4, causing the piston 172 to move to the leftmost position as shown in FIG. 27. In this position, port 1 of the valve is coupled to port 2, coupling the waste water from the reverse osmosis filter 54 to the water storage tank 20 as squeeze water to pressurize the product water for dispensing. In this position, port 3 of the control valve 62 is blocked so that no water passes to drain. However, given a substantial product water flow to the dispenser or ice cube maker, the waste water flow past the outside of the reverse osmosis filter element in filter 54 is relatively fast, thereby acting to clean the reverse osmosis filter element by this high rate of flow. In that regard, the reverse osmosis filter 54 in the preferred embodiment is configured to provide a relatively high flow velocity of waste water past the raw water side of the filter element (i.e., configured for a small flow area) for good cleaning of the outer surface of the element.

Figure 28:
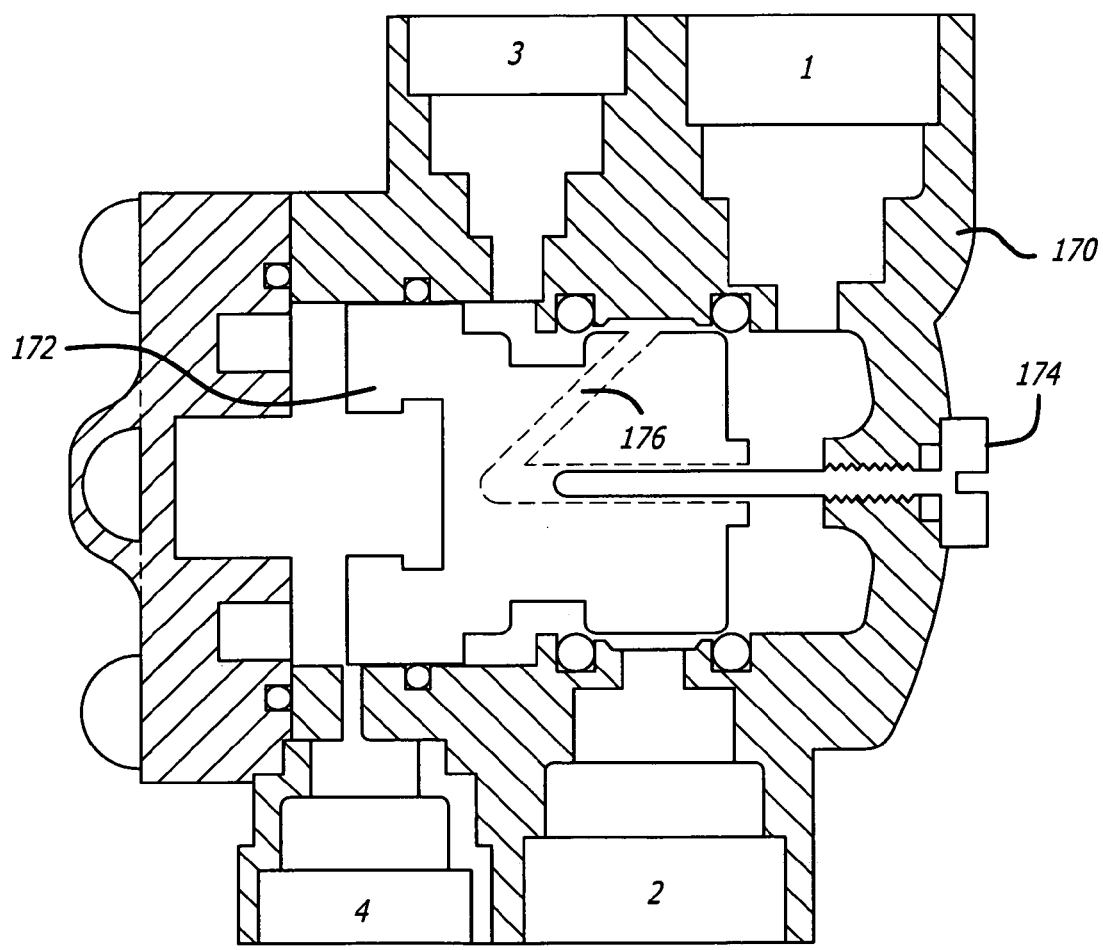
Figure 29:
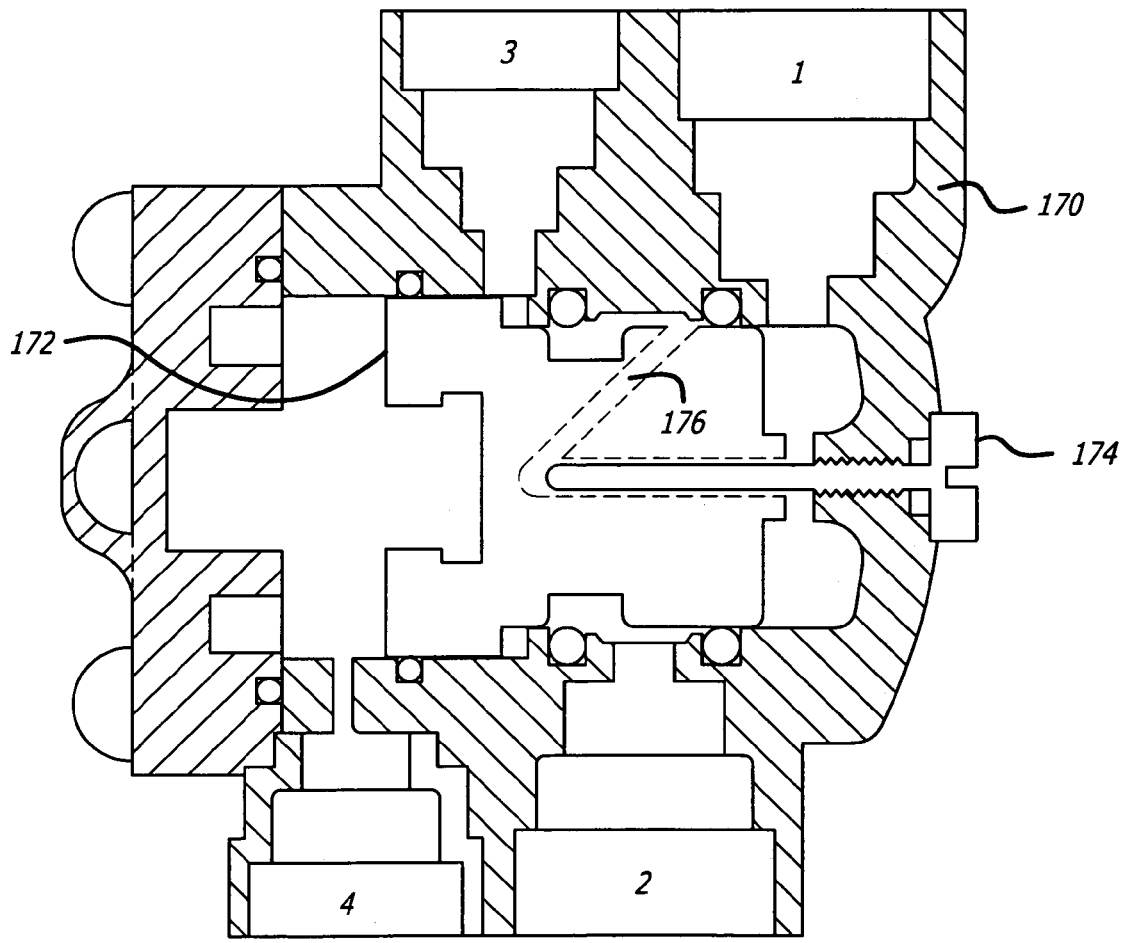

When dispensing stops, the pressure in the dispensing line will recover, increasing the pressure on the large end of piston 172 until the force caused by that pressure on the larger end of the piston overcomes the force of the waste water pressure on port 1 of the valve, forcing the piston 172 toward the right as shown in FIG. 28. When the right end of the piston seals with respect to the rightmost O-ring, waste water port 1 is sealed off from squeeze water port 2, except for a small flow path around the throttling screw 174 to port 2. Accordingly, once the piston 172 relatively rapidly moves to this position, the squeeze water flow rate grossly reduces so that the final recovery of product water pressure provided to port 4 slowly further increases. This slowly forces piston 172 toward the right until port 2 is coupled to port 3, i.e., until squeeze water is coupled to drain. This is shown in FIG. 29. Coupling squeeze water to drain eliminates the pressure on the product water, though check valve 168 maintains the volume of water at the left end of piston 172 so that the piston cannot move toward the left again, in spite of the drop in product water pressure. Since pressure is always applied to the raw water side of the reverse osmosis filter 54, filtering again begins with the product water produced being added to storage tank 20, displacing the now unpressurized squeeze water through port 2 to port 3, the drain port. At the same time, there is a low flow rate of waste water from port 1 past throttling screw 174 and through passage 176 to port 2, and thus to port 3, to drain. In a preferred embodiment, the flow rate of this waste water is set to approximately equal the filtration rate, that is, the rate at this product water is produced. Consequently, for each volume of product water produced, an approximately equal volume of waste water slowing flushing the reverse osmosis filter element is produced, and in addition, an additional equal volume of waste water is produced by the displacement of unpressurized squeeze water to drain. Consequently, in the present invention system approximately one third of the water used by the system is provided as product water, with the system maintaining the same efficiency whether the water storage tank 20 is nearly full or nearly empty. This is to be compared with captive air systems wherein the efficiency steadily decreases as more product water is produced. This is because of the increase in air pressure in the product water storage tank with an increase in the amount of product water stored, all while the waste water flow rate is constant, thereby continuously decreasing the efficiency of the system until the system is shut off. While the efficiency in terms of product water produced compared to total water used, in a preferred embodiment, is approximately one third or 33%, this could be varied by changing the throttling screw 174, and may vary somewhat with raw water pressure if not regulated, though preferably is set to be at least 20%, and more preferably at least 25%. The high efficiency not only conserves water, very important in itself, but also reduces the demands on the filter on the raw water side of the reverse osmosis filter, thereby allowing the use of a smaller filter and/or longer durations between filter changes.

When the product water storage tank 20 is filled the product water pressure will rise toward the pressure of the raw water on line 160. When the product water pressure exceeds the pressure of the product water previously trapped in the line going to port 4 of the control valve, check valve 168 will open, allowing the pressure to increase on the left end of piston 172, forcing the piston back to the position shown in FIG. 26 to shut off all water flow until a dispenser or ice cube maker valve (or some other product water output valve) is again opened.

Figure 30A:
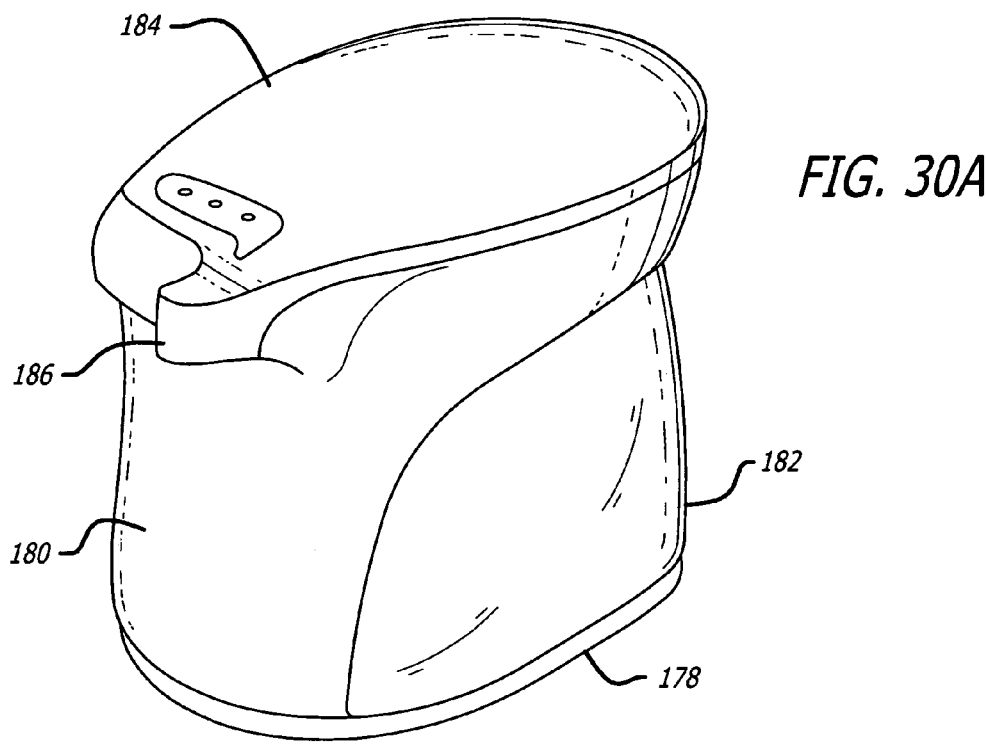
FIGS. 30 and 31 are diagrams illustrating the convertability of the systems of the present invention from above the counter use to below the counter installations.
Figure 30B:
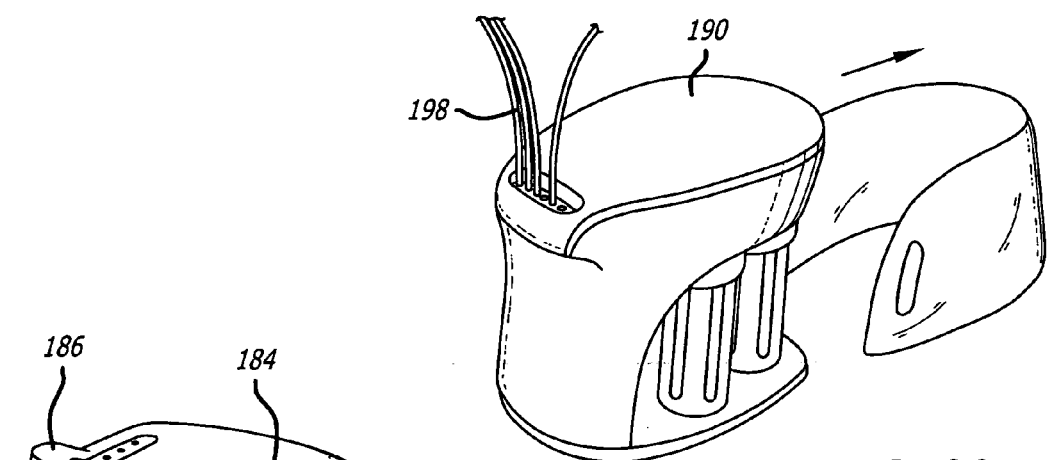
Figure 30C:
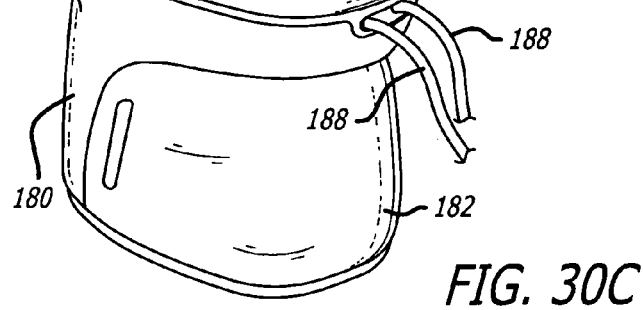

Another aspect of the present invention is its adaptability for either above counter or under counter use, and its adaptability for a multitude of cosmetic embellishments. By way of example, FIGS. 30 and 31 present artist renditions of exemplary enclosures for both above counter or under counter use, each having its own distinctive appearance even though all would house the same basic reverse osmosis water filtration chassis. FIGS. 30a and 30c show the system of an embodiment of the present invention configured for above counter use, wherein a base 178, a decorative enclosure 180 and a moveable back cover 182 house a system, with a top assembly 184 connecting to or sealing the various ports and providing a manually operable dispensing head 186. The removable cover 182 provides access to the filters of the system when the same need to be changed. Water supply and drain lines 188 are provided out the back of the system for connection as required. The same system, however, may also be used under the counter by replacing the cover 184 with cover 190 and connecting the various lines as required, including a connection to an above the counter dispenser and/or ice cube maker or other device using the product water. In that regard, as used herein, the phrase "under the counter" is used in the general sense to mean remote from the product water dispensing valve manually operated or automatically operated by other devices.

Figure 31A:
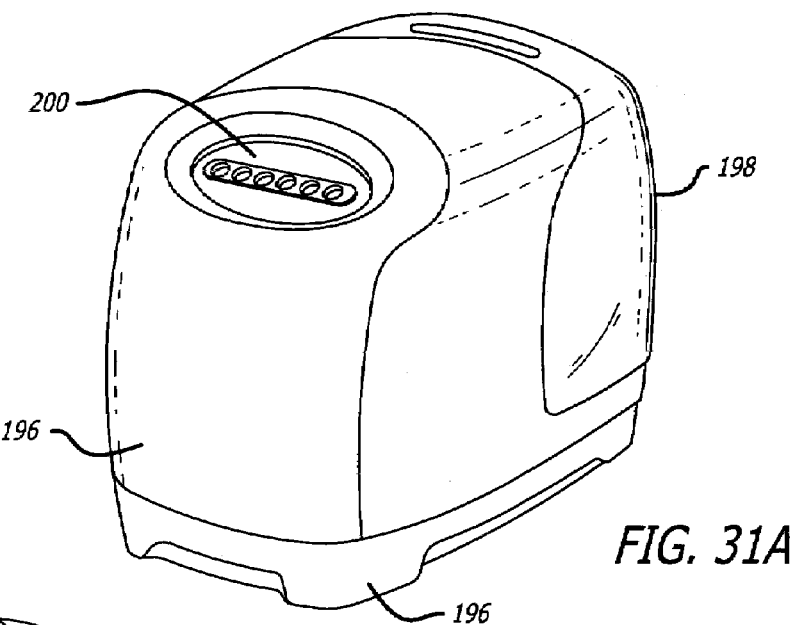
Figure 31B:
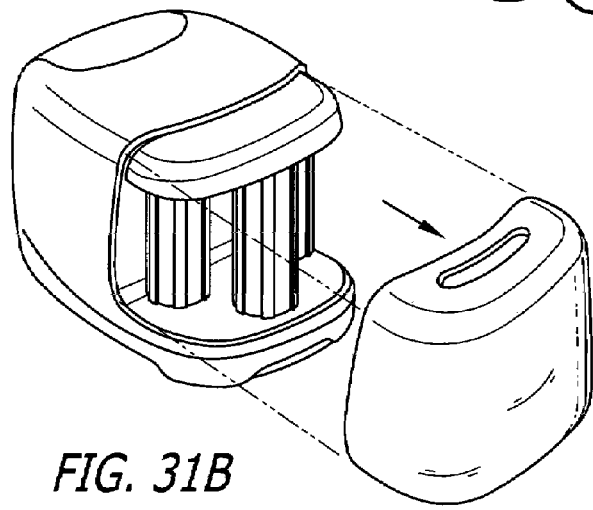
Figure 31C:
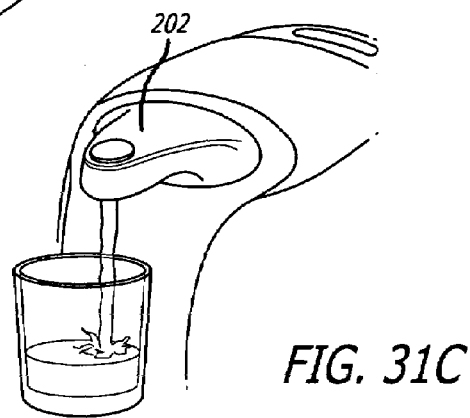

FIG. 31a through FIG. 31c show an alternate housing configuration for the present invention. Here, a base 194, decorative cover 196 and removable back cover 198 are provided. In this embodiment, various water inlet and outlets are connected internally to connections 200, which in turn, may be connected and/or sealed as required for under the counter use. Alternatively, a dispensing head 202 may be connected thereto to, itself connecting to or sealing the appropriate connections on the system. In such a configuration, the raw water supply and connection to drain are brought out through the back of the system.

The ability to convert the system of the present invention from an above the counter to a below the counter system is highly advantageous. In particular, below the counter systems typically have had a separate storage tank, and accordingly, do not facilitate use of the same on the countertop. On the other hand, for evaluation purposes, people may want to use the system on the countertop for a while before permanently installing the system below the counter with a hole through the counter for the dispenser, etc. The present invention allows the easy installation of the system on a counter top, and a minimal change of the system for installation of the same system below the counter, typically at a later date after the user of the system becomes comfortable with the system and committed to its continued use. Thus there is a great marketing advantage to being able to first install and use the system above the counter and then later use the same system with only a minor modification as a below the counter system by removing the dispensing head and making appropriate connections for under the counter use. This avoids having to install one system above the counter, and then later have to swap systems when a below the counter installation is desired.

It should be noted that exemplary embodiments of the system of the present invention have been disclosed herein, though various sub-combinations of the system may also be advantageously used if desired. Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A reverse osmosis filtration system comprising, as a single assembly:

a product water accumulation tank having a bladder therein for separating product water from squeeze water for pressurized dispensing of product water;

upper and lower manifold plates;

a plurality of filters in filter cartridges, including a reverse osmosis filter, each filter cartridge having a bayonet type connector at the top thereof mating with a complementary connector in a lower face of the lower manifold plate;

the product water accumulation tank also having a bayonet type connector at the top thereof mating with a complementary connector in the lower face of the lower manifold plate;

a control valve snapped onto the lower manifold plate, the upper manifold plate having openings through which access to the snaps is provided for release of the snaps if necessary for disassembly of the control valve from the system;

the upper and lower manifold plates being joined along intermediate surfaces by welds to define a manifold assembly, the manifold assembly having ports for connecting to a water supply, a product water output and a waste water output, the manifold assembly functionally coupling the water supply, the filters, the product water accumulation tank, the control valve, the product water output and the waste water output for control by the control valve;

the connections between the lower manifold plate and the filter cartridges, the product water accumulation tank and the control valve being sealed with 0-rings;

the bayonet type connector at the top of each filter and the respective complementary connector in a lower face of the lower manifold plate for each filter being configured so that the connector and complementary connector begin to engage when the respective filter is being attached to the manifold assembly before the respective O-rings begin to engage both the filter and the lower manifold plate, the connector and complementary connector having a sufficient lead so that on rotation of the respective filter in a first direction with respect to the manifold assembly, the filter is drawn toward the lower manifold plate to engage the respective O-rings in sealing engagement with both the filter cartridge and the lower manifold plate before the filter reaches its maxim rotation in the first direction, and on rotation of each filter in a second direction opposite the first direction, the lead of the connector and complementary connector for the respective filter will cause the respective filter to move away from the lower manifold plate to a position wherein the respective O-rings no longer engage both the filter and the lower manifold plate.

2. The system of claim 1 wherein the bayonet type connector at the top of each filter and the respective complementary connector in a lower face of the lower manifold plate for each filter each comprise at least 4 complimentary bayonet type elements.

3. The system of claim 1 wherein the bayonet type connector at the top of each filter and the respective complementary connector in a lower face of the lower manifold plate for each filter each comprise 6 complimentary bayonet type elements.

4. The system of claim 1 wherein the ports in the manifold assembly comprise first and second product water output connections, a third product water connection coupled to the product water side of the bladder and a squeeze water connection coupled to the squeeze water side of the bladder.

5. The system of claim 4 wherein one of the filters is a charcoal filter, and the first and second product water connections are coupled to receive product water from the product water storage tank through the charcoal filter.

6. The system of claim 1 wherein the upper and lower manifold plates are hot welded together.

7. The system of claim 1 wherein the upper and lower manifold plates are hot-plate welded together.

8. The system of claim 1 wherein the control valve is configured to pressurize the squeeze water side of the bladder during dispensing of product water and to pass squeeze water and waste water from the reverse osmosis filter to drain when the system is making product water, the amount of product water produced being at least 20% of the water used from the water supply.

9. The system of claim 1 wherein the control valve is configured to pressurize the squeeze water side of the bladder during dispensing of product water and to pass squeeze water and waste water from the reverse osmosis filter to drain when the system is making product water, the amount of product water produced being at least 25% of the water used from the water supply.

10. The system of claim 1 wherein the control valve is configured to pressurize the squeeze water side of the bladder during dispensing of product water and to pass squeeze water and waste water from the reverse osmosis filter to drain when the system is making product water, the amount of product water produced being approximately 33% of the water used from the water supply.

* * * * *

UNITED STATES PATENT AND TRADEMARK OFFICE
CERTIFICATE OF CORRECTION

| | |
|---|---|
| PATENT NO. | : 7,601,256 B2 |
| APPLICATION NO. | : 11/509906 |
| DATED | : October 13, 2009 |
| INVENTOR(S) | : Timothy A. Beall |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 442 days.

Signed and Sealed this

Fourteenth Day of December, 2010

David J. Kappos
*Director of the United States Patent and Trademark Office*